(12) United States Patent
Guo

(10) Patent No.: US 7,412,245 B2
(45) Date of Patent: Aug. 12, 2008

(54) DYNAMIC WIRELESS MESHING NETWORK FOR SUPPORTING LOAD BALANCE AND FLOW CONTROL

(75) Inventor: Ming-Wang Guo, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 263 days.

(21) Appl. No.: 11/262,792

(22) Filed: Nov. 1, 2005

(65) Prior Publication Data

US 2007/0099624 A1    May 3, 2007

(51) Int. Cl.
*H04Q 7/20* (2006.01)

(52) U.S. Cl. ............... 455/453; 455/41.2; 455/452.1; 455/445; 370/235; 370/238

(58) Field of Classification Search ............... 455/453, 455/522, 456.2, 41.2, 504, 525; 370/328, 370/326, 400, 338, 343, 471, 472, 235, 238; 709/242
See application file for complete search history.

(56) References Cited

U.S. PATENT DOCUMENTS 7,280,483 B2 * 10/2007 Joshi ........................ 370/238

| | | | | |
|---|---|---|---|---|
| 2003/0179707 A1 * | 9/2003 | Bare | ........................ | 370/235 |
| 2004/0199668 A1 * | 10/2004 | Lin et al. | ..................... | 709/241 |
| 2006/0164969 A1 * | 7/2006 | Malik et al. | ................. | 370/203 |
| 2006/0165103 A1 * | 7/2006 | Trudeau et al. | ............. | 370/401 |
| 2006/0280152 A1 * | 12/2006 | Lee et al. | ..................... | 370/338 |
| 2007/0030823 A1 * | 2/2007 | Guo et al. | ..................... | 370/328 |
| 2007/0198739 A1 * | 8/2007 | Jennings et al. | ............. | 709/231 |
| 2008/0040509 A1 * | 2/2008 | Werb et al. | ................... | 709/242 |

* cited by examiner

*Primary Examiner*—Tan Trinh
(74) *Attorney, Agent, or Firm*—Bacon & Thomas, PLLC

(57) ABSTRACT

The present invention relates to a dynamic wireless meshing network system, which applies a management frame stipulated in IEEE 802.11 standard for regulating access point (AP) to a wireless distribution system (WDS) mode and adds an information element (IE) to the management frame, enabling an AP to select another AP having smaller hop count value and service hop count value to establish a wireless link therewith according to information in a hop count field and a service hop count field of the IE provided by the another AP and to determine whether a wireless link therebetween should be established according to information of real time network flow in a RunOutofVport field of the same IE for achieving the goal of establishing a dynamic wireless meshing network system with high efficiency, low loading and simple topology for supporting load balance and flow control.

64 Claims, 17 Drawing Sheets

DYNAMIC WIRELESS MESHING NETWORK FOR SUPPORTING LOAD BALANCE AND FLOW CONTROL

FIELD OF THE INVENTION

The present invention relates to wireless networking, more particularly to a dynamic wireless meshing network, which applies a management frame stipulated in IEEE 802.11 standard for regulating access point (AP) to a wireless distribution system (WDS) mode and adds an information element (IE) to the management frame, enabling an AP to select another AP having smaller hop count value and service hop count value to establish a wireless link therewith according to information in a hop count field and a service hop count field of the IE provided by the another AP for achieving the goal of establishing a dynamic wireless meshing network system with high efficiency, low loading and simple topology for supporting load balance and flow control.

BACKGROUND OF THE INVENTION

Wireless network has many advantageous features and is therefore capable of eliminating many drawbacks of wire network. Recently, wireless meshing networks based on IEEE 802.11 wireless network protocol have become the trend of current wireless network development. Such trend is significant in view of how to develop wireless meshing networks based on interconnection of access points (APs). However, no standard for IEEE 802.11 wireless networking based meshing networks has been published by IEEE because IEEE did not anticipate that IEEE 802.11 will develop so quickly at the time of publishing IEEE 802.11. Further, no relevant draft has been initiated yet. Thus, many network service providers have begun to develop their own wireless meshing networks.

There are many significant differences in terms of physical features between a wire network and a wireless network. Services provided by a wireless network are also different from that provided by a wire network. Further, a number of potential problems exist when a wireless network and a wire network integrate. Most of wireless meshing networks developed by the network service providers cannot satisfy needs of vast users. The wireless meshing networks are not flexible as compared with wire meshing networks. Moreover, many problems about network establishment, meshing establishment and maintenance, and network management are yet solved. Such problems also exist and are yet solved in developing wireless meshing networks in a wireless distribution system (WDS).

In addition, performance of a wireless network is closely related to a wireless meshing. This is because wireless medium is shared and is a limited resource. It highly depends on the implementation of Carrier Sense Multiple Access/Collision Avoidance (CSMA/CA). Thus, it is important to effectively share wireless bandwidth among computers. Further, interference and noise may adversely affect the transmission performance of a wireless link. It is understood that the transmission performance of a wireless network may decrease to about half when a new wireless link is established in the wireless network according to many available documents. Further, a wireless network may degrade due to wireless meshing network growth. As a result, the performance of a wireless network is low while it is busy all the time.

Referring to FIGS. 1 and 2, two prior wireless meshing networks are shown. Either wireless meshing network has an AP connected to a wire network. The connected AP has its signals covered the remaining three APs disconnected from the wire network. Four APs in FIG. 1 are located about the same as that in FIG. 2, except that AP 1-4 is in direct wireless connection to AP 1-1 in FIG. 1 and AP 2-4 is not in direct wireless connection to AP 2-1 in FIG. 2. There are three APS including AP 1-2, AP 1-3, and AP 1-4 not in direct wireless connection to the wire network as shown in meshing in FIG. 1. For transmitting data over the wire network, for example, AP 1-4 wants to send a packet to AP 1-1 and thus AP 1-4 may first send a Request To Send signal (RTS) to AP 1-1. After receiving the RTS, AP 1-1 may send a Clear To Send signal (CTS) to other adjacent APs to wait if AP 1-1 is ready to receive the packet. This can avoid collision when AP 1-4 sends a packet. In other words, other APs in the meshing in FIG. 1 will wait (i.e., stop sending packet) when AP 1-4 sends a packet.

The above case is also applicable to meshing in FIG. 2. It is seen that wireless meshing in FIG. 2 is different from that shown in FIG. 1. Thus, in a case of AP 2-4 sending packet to AP 2-1, AP 2-4 must first send RTS to AP 2-3. After receiving the RTS, AP 2-3 may send a CTS to other adjacent APs to wait if AP 2-3 is ready to receive the packet. This can avoid collision when AP 2-3 sends a packet. In detail, no collision occurs when AP 2-4 sends a packet to AP 2-3 if AP 2-2 is covered by AP 2-3 in signal transmission. As compared with meshing in FIG. 1, AP 2-3 has to perform the same transmission again in order to send the packet transmitted from AP 2-4 to AP 2-1. In comparison, AP 1-4 has a transmission performance higher than that of AP 2-4.

Similarly, as shown in meshing in FIG. 2 in a case of AP 2-4 sending a packet to AP 2-1 AP 2-2 sends a RTS to AP 2-1 if AP 2-2 is not covered by AP 2-3 in signal transmission and AP 2-2 also wants to send a packet to AP 2-1. At this time, AP 2-2 will send a RTS to AP 2-1 if AP 2-1 wants to receive the packet transmitted from AP 2-2. But AP 2-1 may be interfered by AP 2-3 when AP 2-2 sends a packet to AP 2-1. As a result, the transmission performance is low. Likewise, AP 2-3 may be interfered by AP 2-1 when AP 2-1 sends an acknowledge signal (ACK) to AP 2-2. Thus, in view of wireless meshing networks in both FIG. 1 and FIG. 2, more wireless links in the packet transmission path may not only decrease the transmission performance but also cause interference. Thus, smaller hop count regarding connecting to a wire network can increase the transmission performance of a wireless meshing network.

Referring to FIG. 3, a stable wireless meshing network is shown. AP in the network is labeled by AP a-b where "a" represents the number of hop(s) that an AP passes prior to connecting to a wire network and "b" represents the b-th AP passed hop(s) prior to connecting to the wire network. Referring to FIG. 4, a new AP X-Y is added in the wireless meshing network in FIG. 3. AP X-Y is in partial signal coverage with AP 2-2, AP 3-3, and AP 4-4. The added AP X-Y is connected to AP 3-3 or AP 4-4 and the meshing is expanded. Thus, the added AP X-Y is labeled as AP 4-5 based on the above naming rule. The number of APs that AP 2-1 is about to service is larger than the number of APs that AP 2-2 is about to service. Thus, a packet may follow a path from AP 4-5, AP 3-3, and AP 2-1 to AP 1-1 prior to sending to a wireless meshing network. However, the transmission performance is low because bandwidth is narrow due to contention. To the contrary, the transmission performance can be increased if bandwidth is made wide due to less contention by causing the added AP X-Y to be in direct wireless connection to AP 3-4. For the same reason, the transmission performance can be further increased by decreasing the number of hop(s) that an AP passes prior to connecting to a wire network by causing the added AP X-Y to be in direct wireless connection to AP 2-2.

To the contrary, the transmission performance of a wireless network may decrease to about half when hop count increases by one in the packet transmission path.

In view of above, it is thus desirable among wireless network service providers to achieve the following goals. In a case of adding an AP to a wireless meshing network how to enable the AP to select a less complicated wireless meshing network based on received signals when the wireless meshing network is expanding. Alternatively, how to decrease the number of hop(s) that an AP passes prior to connecting to a wire network in order to decrease hop count of the meshing and decrease the number of times of repeatedly sending the same packet in a wireless environment and thereby increase the transmission performance of the wireless network, decrease network load, prevent interference from occurring, optimize wireless link, effectively increase bandwidth utilization, and solve the problem of load unbalance.

SUMMARY OF THE INVENTION

After considerable research and experimentation, a dynamic wireless meshing network for supporting load balance and flow control according to the present invention has been devised so as to overcome the above drawbacks of the prior art including unstable link after an AP joining the wireless meshing network, bandwidth waste, and load unbalance. By implementing the wireless meshing network in a wireless distribution system (WDS) mode, different APs are able to quickly and automatically configure an optimal wireless meshing network with respect to characteristics of wireless networking. Moreover, an AP in the wireless meshing network is able to connect to a wire network via an optimal path (i.e., a minimum hop count) and thereby increase the performance of the wireless meshing network. As an end, the purposes of supporting load balance and flow control by a simple, dynamic wireless meshing network of high efficiency with low load are achieved.

In a first aspect of the present invention a management frame in IEEE 802.11 standard for defining an access points (AP) in a wireless distribution system (WDS) mode is implemented. The management frame has an information element (IE) having a field capable of enabling an AP to determine operating state of any of other APs and thereby determine whether a wireless link therewith should be established in a wireless routing mechanism. The IE further comprises a hop count field for representing a sum of the number of wireless links and the number of wire links that an AP in the wireless meshing network prior to connecting to a wire network. Thus, a new AP about to join the stable wireless meshing network is adapted to receive a probe request packet from one of other APs in the wireless meshing network, analyze and compare values of the hop count fields, and select an AP having a smaller hop count value as one to establish a wireless link therewith. As an end, an efficient and simple wireless meshing network is formed.

In a second aspect of the present invention the IE further comprises a service hop count field for representing the number of APs not in direct connection to the wire network such that the APs are required to connect to the wire network via a service provided by a predetermined AP. The number of the APs not in direct connection to the wire network is the service hop count of the predetermined AP. Thus, a new AP about to join the stable wireless meshing network is adapted to receive a probe request packet from one of other APs in the wireless meshing network, analyze and compare values of the service hop count fields, and select an AP having a smaller service hop count value (i.e., one has a low load and a simple meshing) as one to establish a wireless link therewith. As an end, a wireless meshing network for supporting load balance is formed.

In a third aspect of the present invention the IE further comprises a RunOutofVport field for representing whether an AP is capable of establishing wireless links (i.e., one or more physical wireless links). The RunOutofVport field includes a first mode of not allowing the AP to establish a wireless link with other APs and a second mode of allowing the AP to establish a wireless link with other APs. A real time network flow indicated by the RunOutofVport field is provided to the AP in the second mode such that an AP about to join the stable wireless meshing network is adapted to receive a probe request packet from one of other APs in the wireless meshing network, analyze and compare values of the hop count fields and the service hop count fields, and select an AP having a smaller hop count value and a smaller service hop count value as one to establish a wireless link therewith. Alternatively, the added AP is adapted to determine whether a wireless link should be established based on a value of the RunOutofVport field received from the IE when at least two APs capable of providing identical and preferred link are found by the added AP. The RunOutofVport field in the IE will be shown in the second mode when any AP is allowed to establish a wireless link. A real time network flow indicated by the RunOutofVport field in the IE is provided to the added AP. The added AP is thus able to determine whether a link should be established or not based on the real time network flow. The added AP. Further, the added AP select an AP having less network flow as one to establish a wireless link therewith. As an end, a sufficient bandwidth is obtained, a reliable flow control of the wireless meshing network is carried out, a wireless link is established by the wireless meshing network when there is a network flow difference, and a wireless meshing network for supporting load balance is formed.

In a fourth aspect of the present invention in response to the added AP determining that there are at least two APs having substantially the same link conditions without heavy load, the added AP is adapted to select an AP having a stronger signal based on received signal strength as one to establish a wireless link therewith in the wireless meshing network.

In a fifth aspect of the present invention a maximum number of wireless links of each AP can be selectively set by The maximum number of wireless links is a default value of the network if no setting is made by the user. Also, the maximum number of wireless links of one AP may be different from that of the other AP. Thus, the maximum number of wireless links of one AP is limited based on characteristics and needs of respective APs. Also, the number of wireless links of APs can be averaged for achieving the purposes of load balance, effectively employing bandwidth, and even satisfying a number of predetermined APs not providing services to link subsequent APs.

In a sixth aspect of the present invention the IE further comprises Default Group ID (DGID) field and an Escape field. The DGID field is adapted to represent a group ID of a group that an AP wants to join. The Escape field is adapted to represent whether an AP is capable of accepting to establish a wireless link with another AP having a different DGID and thereby facilitating management of by network staff. The Escape field comprises three modes including an acceptable escape mode, an unacceptable escape mode, and all APs in the same group being in unacceptable escape mode. The third mode is not required to set all APs in the same group. To the contrary, a root AP may inform other APs via IE. The third mode has a priority higher than other two modes. By utilizing this, the present invention enables respective APs to have the right of selecting service target by simply setting both the DGID field and the Escape field. That is, the present invention enables respective APs having different attributes to have the right of selecting service target in order to form a private wireless network system.

In a seventh aspect of the present invention the IE further comprises a unique selection link field for representing that there is a unique AP having a minimum value of a hop count field in all other APs within a signal communication range of a predetermined AP. The AP is about to establish a wireless link with the predetermined AP and the unique selection link field is then enabled so as to inform the predetermined AP in a negotiation phase that once the unique selection link field is enabled a MAC address of the predetermined AP is filled in the unique selection link field instead of sending the management packet of the predetermined AP by broadcasting, and the AP is capable of establishing a link with the predetermined AP. Moreover, in response to moving the predetermined AP to be in partial signal coverage with a first one of other APs, the unique selection link field associated with the predetermined AP is disabled. A link between the predetermined AP and the first one of other APs is interrupted when the predetermined AP is aware that there are fewer subsequent APs to be serviced by the first one of the other APs. Next, a wireless link between the predetermined AP and a second one of the other APs is established. In view of above, the present invention enables APs to provide load balance service and considers signal coverage of subsequent APs of a predetermined AP in view of AP movement and thereby establish a wireless link with load balance.

In an eighth aspect of the present invention in response to comparing a first condition of a service hop count difference between two APs having a minimum hop count within a signal communication range of the predetermined AP before linking is changed with a second condition of a service hop count difference between the same APs having a minimum hop count within the signal communication range of the predetermined AP after linking is changed, either the predetermined AP is adapted to change the link if it is determined that the first condition is larger than the second condition so as to form a wireless link with high performance and wireless meshing balance, or the predetermined AP is not adapted to change the link if it is determined that the first condition is not larger than the second condition.

The above and other objects, features and advantages of the present invention will become apparent from the following detailed description taken with the accompanying drawings.

DETAILED DESCRIPTION OF THE PREFERRED EMBODIMENTS

Figure 1:
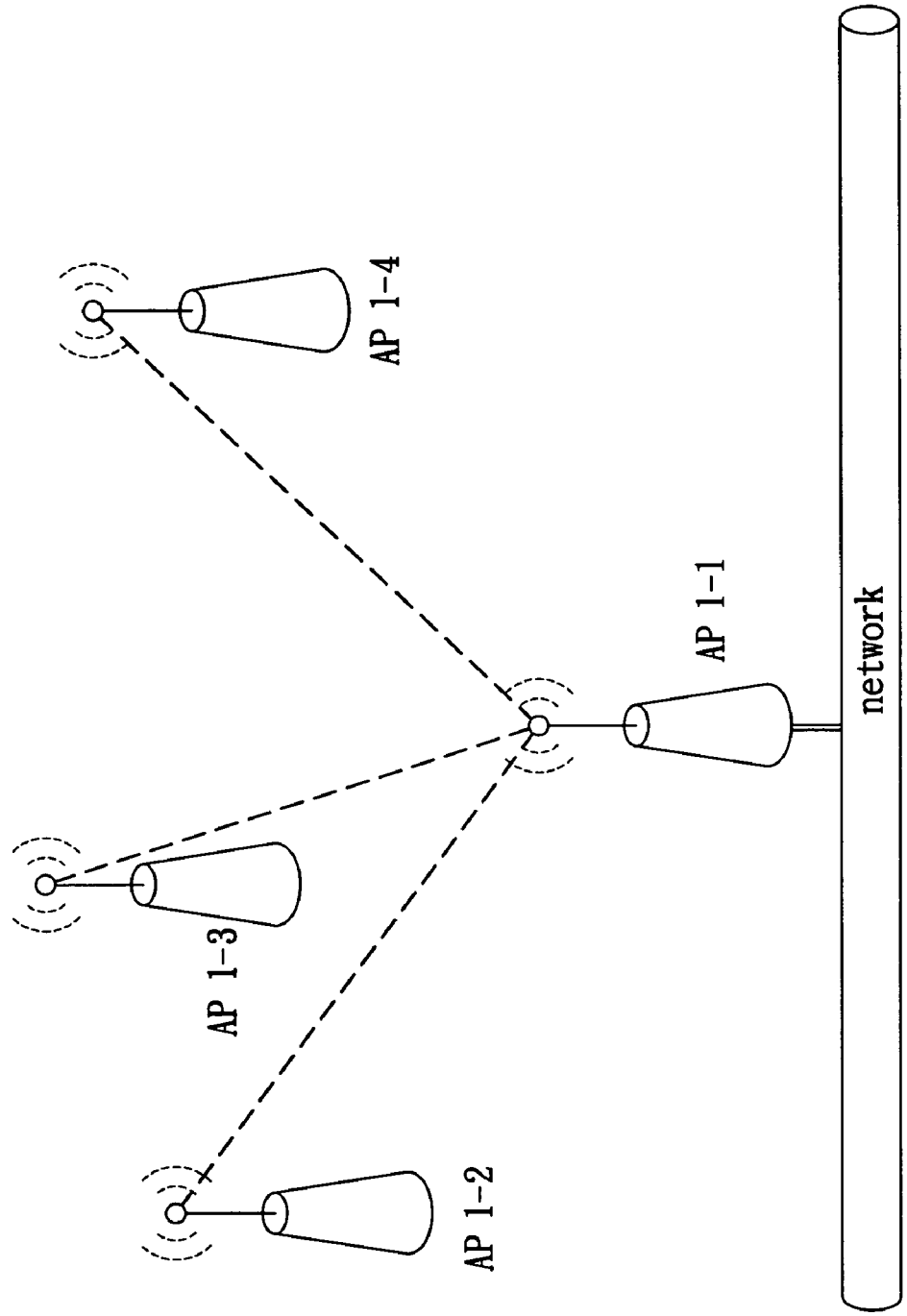
FIG. 1 schematically depicts wireless links including a direct wireless link between AP 1-4 and AP 1-1 according to the structure of a prior wireless meshing network.
Figure 2:
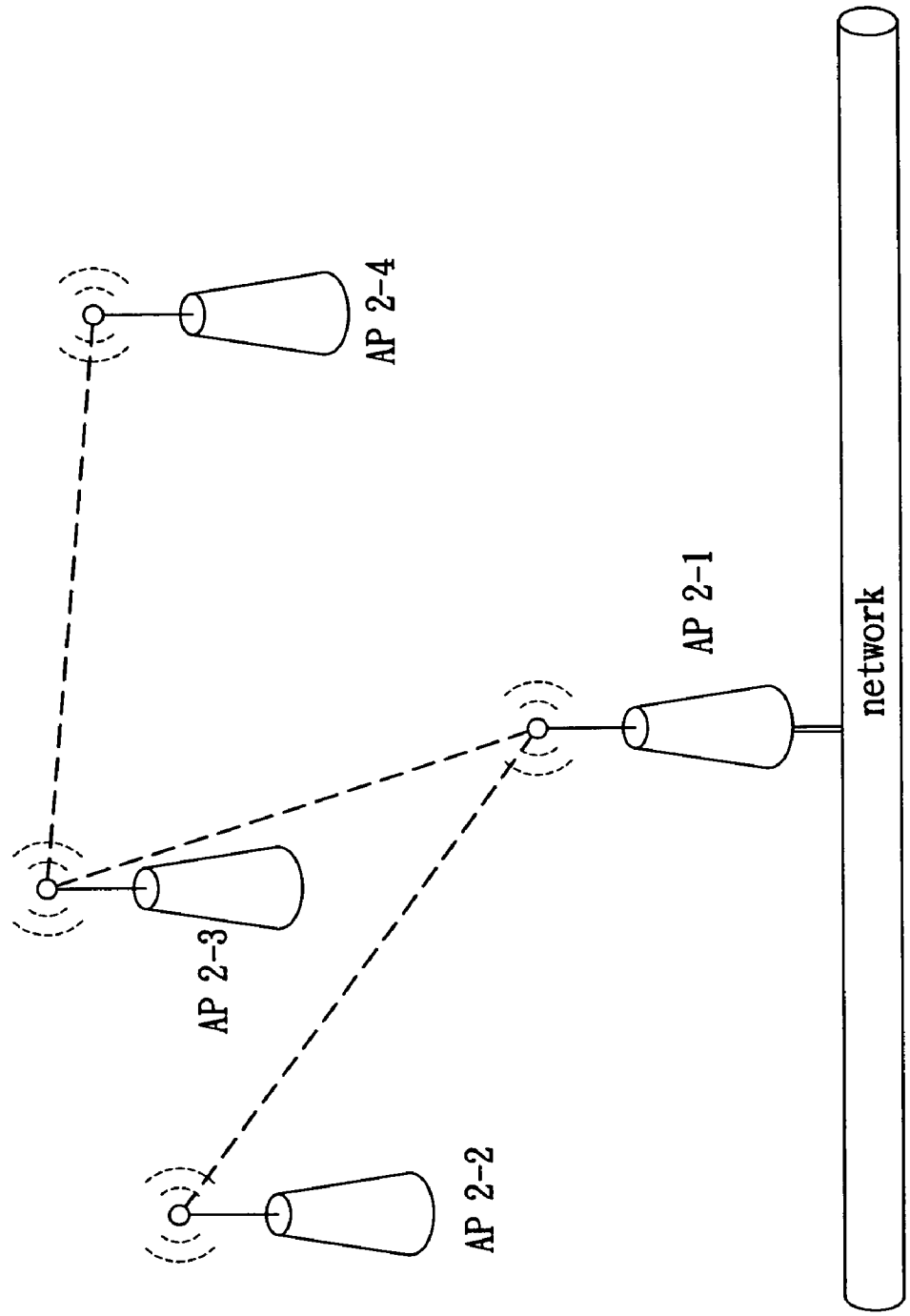
FIG. 2 schematically depicts wireless links without a direct wireless link between AP 2-4 and AP 2-1 according to the structure of another prior wireless meshing network.
Figure 3:
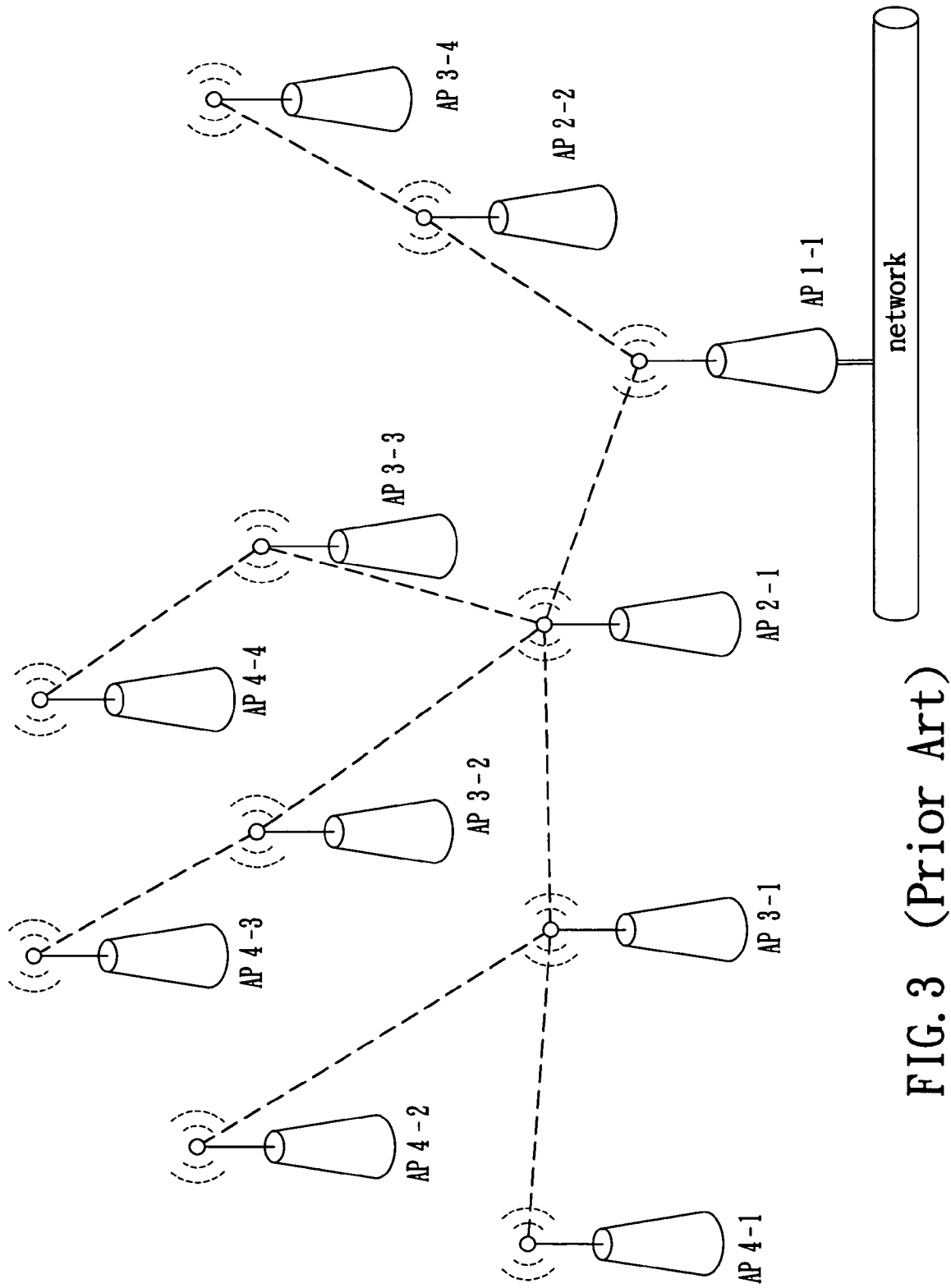
FIG. 3 schematically depicts the structure of a stable wireless meshing network.
Figure 4:
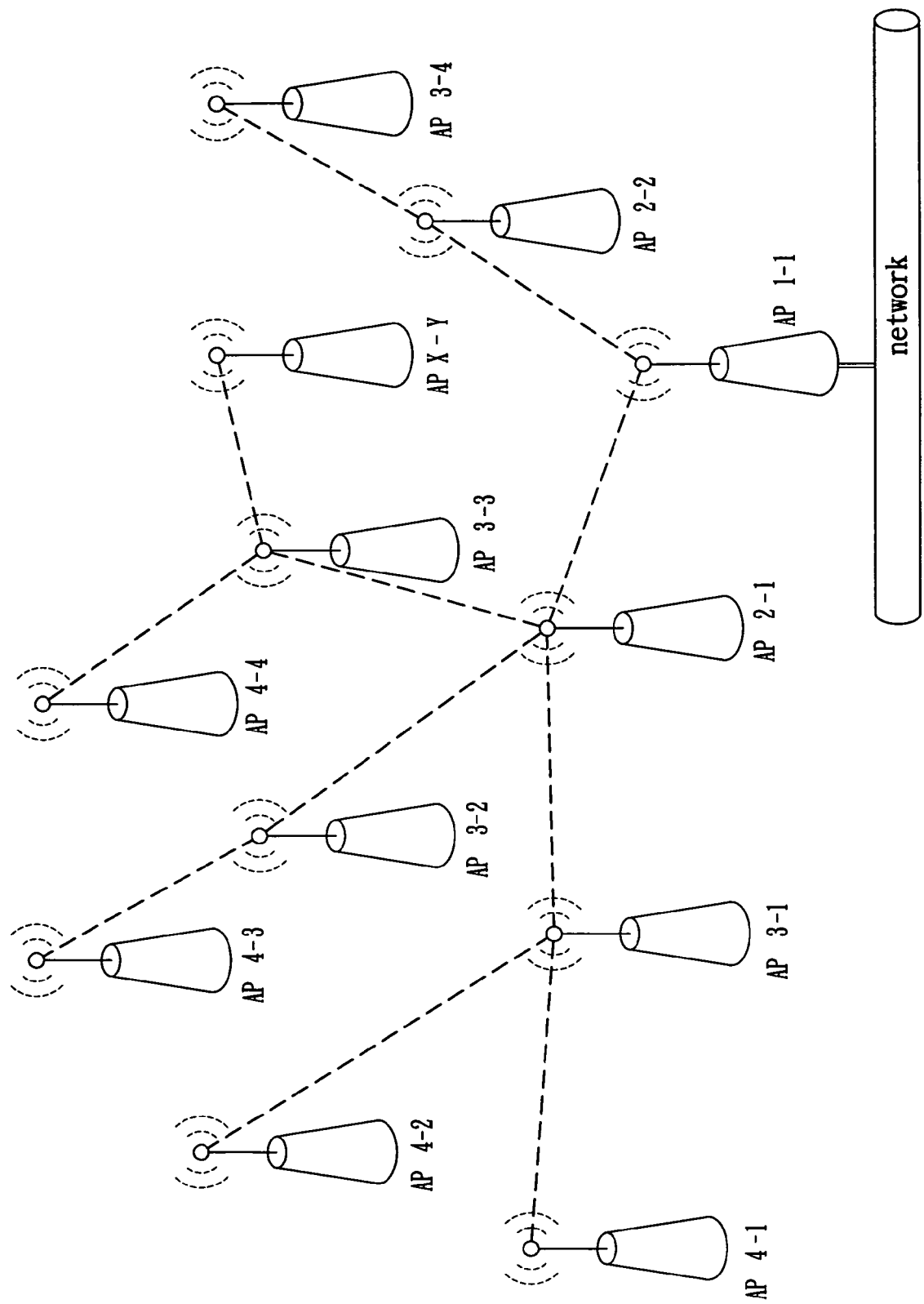
FIG. 4 schematically depicts wireless links in the structure of the wireless meshing network in FIG. 3 where an AP X-Y is added thereto.

In IEEE 802.11 standard, three types of frame are defined. Namely, management frame, data frame, and control frame. The management frame serves as a communication frame between an AP and a station (STA). That is, communication between an AP and a STA is made possible via the management frame in order to then determine whether a link should be established. The invention applies management frame features to different APs based on management frame functionalities such that a link between any two APs (i.e., wireless link between APs) thus can be established. The management frame is adapted to communicate based on an information element (IE) contained therein. Thus, an AP must maintain the integrity of IE based on setting and states itself in order to appropriately send IE by management frame. Thus, as contemplated by the invention an added IE is adapted to provide a WDS state to AP. Any AP is able to determine other APs' operations in WDS based on received IE. Next, the AP can determine whether a physical link between itself and any of other APs should be established. Also, the AP is able to maintain the state in real time with respect to established physical link.

In a wireless routing mechanism of the invention after a first AP is activated, the first AP may regularly send a probe request frame by broadcasting. Also, a new IE is added in the probe request frame. Alternatively, the IE can send a probe request frame via another management frame. IE can not only declare itself as an AP capable of supporting the wireless routing mechanism of the invention but also send a current state of itself in real time. All APs supporting the wireless routing mechanism of the invention can receive the probe request frame, analyze information provided by the IE, and store the real time information in a bridge table (BT) since the probe request frame is a broadcast frame. At this time, a probe response is sent back as a response to the probe request sent from the first AP when a second AP receives the probe request frame. At the time of negotiation finish, whether a wireless link between first and second APs should be established can be decided. A probe request frame is sent regularly between two APs. Thus, the APs can determine whether a wireless link exists based on the probe request frame. Thereafter, the APs can establish a new meshing through RSTP or any known meshing growth protocol. In other embodiments of the invention the second AP may send a response probe in a manner other than above as a response to the probe request sent from the first AP when the second AP receives the probe request frame.

For achieving the purpose of enabling each AP to determine whether a wireless link should be established based on received ID, the invention first defines fields in an added IE as detailed below.

a) Element ID field: It is a requisite field according to IEEE standard. It is a first field of IE, has a length of 1B, and is adapted to store ID of IE. Contents of Element ID field must be different from any used ID.

b) Length field: It is a requisite field according to IEEE standard. It is a second field of IE, has a length of 1B, and is adapted to store total length of IE, i.e., store the number of bytes accumulated from a third field to the last field of IE.

c) Default Group ID (DGID) field: It is an added field, has a fixed length, and is adapted to represent a group ID of a group that an AP desires to enter. That is, a group has a group ID with the highest priority of entering. However, in practice a default group is not necessary to be the last added group. To the contrary, DGID is simply a priority reference. Thus, this field is not a requisite field. In other words, different APs with the same DGID have the highest priority of establishing a wireless link therebetween. As a result, an infrastructure of groups is established. Different APs with different DGIDs also can establish a wireless link in a specific mode. In the wireless routing mechanism of the invention, each of all APs has its own DGID and which can be set by user. In view of this feature, it means that each AP has the highest priority of entering a specific AP group.

d) Current Group ID (CGID) field: It is an added field, has a fixed length, and is adapted to represent a group ID of an AP when the wireless routing mechanism of the invention performs. As such, other APs may be aware of whether a specific group exists and operates. Thus, it is a requisite field. In the wireless routing mechanism of the invention, each of all APs eventually enters a specific group and ID of the specific group is CGID.

e) Role of AP field: It is an added field, has a fixed length, and is adapted to represent a current role of AP when the wireless routing mechanism of the invention performs. Only one of Role of AP field and Hello field is selected as a requisite field. In the wireless routing mechanism of the invention, each of all APs has its own default role and which is set by user. In view of this feature, it means that each AP has the highest priority of playing the role in a specific AP group. The default role comprises the following five types:

(1) Root AP: It means an AP is in a state of connecting to a wire network. The AP thus can provide services to subsequent disconnected APs for establishing a wireless link.

(2) Backup Root (or simply Backup) AP: It means an AP is in a state of connecting to a wire network. But the AP cannot provide services to subsequent disconnected APs for establishing a wireless link.

(3) Pure AP: It means an AP is not in a state of connecting to a wire network. The AP thus has to connect to a wire network via services provided by other Root APs.

(4) Escape Pure (or simply Escape) AP: It means an AP is in a state of connecting to a wire network via other APs having different DGID fields.

(5) Initial Pure (or simply Initial) AP: It means an AP is in a state having a role being transient. At this time, the AP has not established a wireless link or the established wireless link has interrupted.

f) Hello field: It is an added field, has a fixed length, and is adapted to represent which role of AP is when the AP is sending IE. Only one of Hello field and Role AP field is selected as a requisite field.

g) RunOutofVport field: It is an added field, has a fixed length, and is adapted to represent whether an AP can establish a new wireless link. That is, it indicates whether an AP has the capability of establishing more physical wireless links. Whether one or more new wireless links should be established depends on the number of established links. This is for the purpose of balancing load. Thus, it is not a requisite field. Moreover, load of an AP can be determined based on the current network flow indicated by the RunOutofVport field if the AP still wants to establish a link. Thus, other APs may establish a link based on the load. Two modes are implemented in establishing a wireless link.

Mode I: New wireless link between the AP and any of other APs is not allowed.

Mode II: The AP is allowed to establish a wireless link. A current network flow is required to provide in order to effectively utilize RunOutofVport field. Thus, RunOutofVport field is required to provide the current network flow when Mode II is performed and thereby other APs may establish a link based on the flow.

h) Sequence field: It is an added field, has a fixed length, and is adapted to represent a sequence number of a latest available IE and thus indicate existence of a specific group. In other words, count of Sequence field is increased by one when root AP sends a management frame having an IE. Other APs in the same group may take a maximum value of the received field as content to be sent. Thus, it is a requisite field.

i) MACofRootAP field: It is an added field, has a fixed length, and is adapted to represent MAC value of root AP in the AP group. MAC value is non-repetitive and is fixed. Thus, it is a requisite field.

j) Channel field: It is an added field, has a fixed length, and is adapted to represent an operating channel of a group. Similar channels exist in other management frames. Thus, it is not a requisite field.

k) AP Management Name field: It is an added field and has a variable length depending on length of a set name. It is simply a field for facilitating management by network staffs. Thus, it is not a requisite field.

l) Escape field: It is an added field, has a fixed length, and is adapted to represent whether an AP can accept to establish a wireless link with another AP having a different DGID. It is simply a field for facilitating management by network staff. It is an attached field and has the following modes:

Mode I: Acceptable escape mode;
Mode II: Unacceptable escape mode; and
Mode III: All APs in the same group are in unacceptable escape mode in which it is not required to set all APs in the same group in the mode. To the contrary, a root AP may inform other APs via IE of the invention. This mode has higher priority as compared with other two modes.

m) Hop count field: It is an added field, has a fixed length, and is adapted to represent a sum of the number of wireless link(s) and the number of wire link(s) that an AP in a wireless meshing network passes prior to connecting to a wire network in which one of the wireless link(s) and the wire link(s) is a wire link and the remaining ones are wireless link(s). It has the following two modes:

Mode I: An optimal hop count is stored in the field when an AP is in a ready state (i.e., a connection is not established). Specifically, a minimum hop count contained in a received packet is stored in the field when the AP is in its signal communication range. Thus, other APs are aware of the number of optimal hop count that the AP is able to establish.

Mode II: The current hop count is stored in the field when an AP is in a stable state (i.e., a connection is established). The current hop count represents the number of hop(s) that an AP passes prior to connecting to a wire network in which one of the hop(s) is a wire link and the remaining ones are wireless links.

n) Service hop count field: It is an added field, has a fixed length, and is adapted to represent the number of AP(s) not in direct wireless connection to a wire network such that the AP(s) must connect to the wire network via a specific AP service. The number of AP(s) not in direct wireless connection to the wire network is the service hop count of the specific AP. It has the following two modes:

Mode I: An optimal service hop count of all APs having an optimal hop count is stored in the field when an AP is in a ready state (i.e., a connection is not established). Thus, other APs are aware of the number of optimal service hop count that the AP is able to establish.

Mode II: The current service hop count of an AP is stored in the field when the AP is in a stable state (i.e., a connection is established).

o) Unique selection link field: It is adapted to represent that there is a unique AP having a minimum value of a hop count field in all other APs within a signal communication range of a specific AP.

Note that in the fields described above only Element ID field and Length field are sequential and fixed order among the remaining fields is permitted. As to length of each of the above fields, only Element ID field and Length field have fixed lengths and the remaining fields have variable lengths depending on applications. Further, IE defined by the invention consists of a plurality of the above fields. But in practice it is contemplated by the invention to configure each IE to have information about one or more fields depending on needs or convenience.

It is clear from DGID field and CGID field defined by the invention, the idea of group is added in the wireless routing mechanism of the invention and the purpose thereof is to enable different APs to determine attributes of AP based on IE contained in the management frame. Thereafter, whether a physical link to be established can be decided based on attribute negotiation. APs in the group have attribute adapted to negotiate in nature. Thus, such determination can stop excessive expansion of wireless network meshing, greatly decrease complexity of wireless network meshing, and prevent transfer performance from decreasing due to excessive expansion of wireless network meshing. Moreover, it is understood that APs in different geographical areas must have different attributes and transfer quality. Thus, bandwidth of wireless network can be effectively employed if APs having a great attribute difference therebetween are not allowed to establish a physical link directly.

Figure 5:
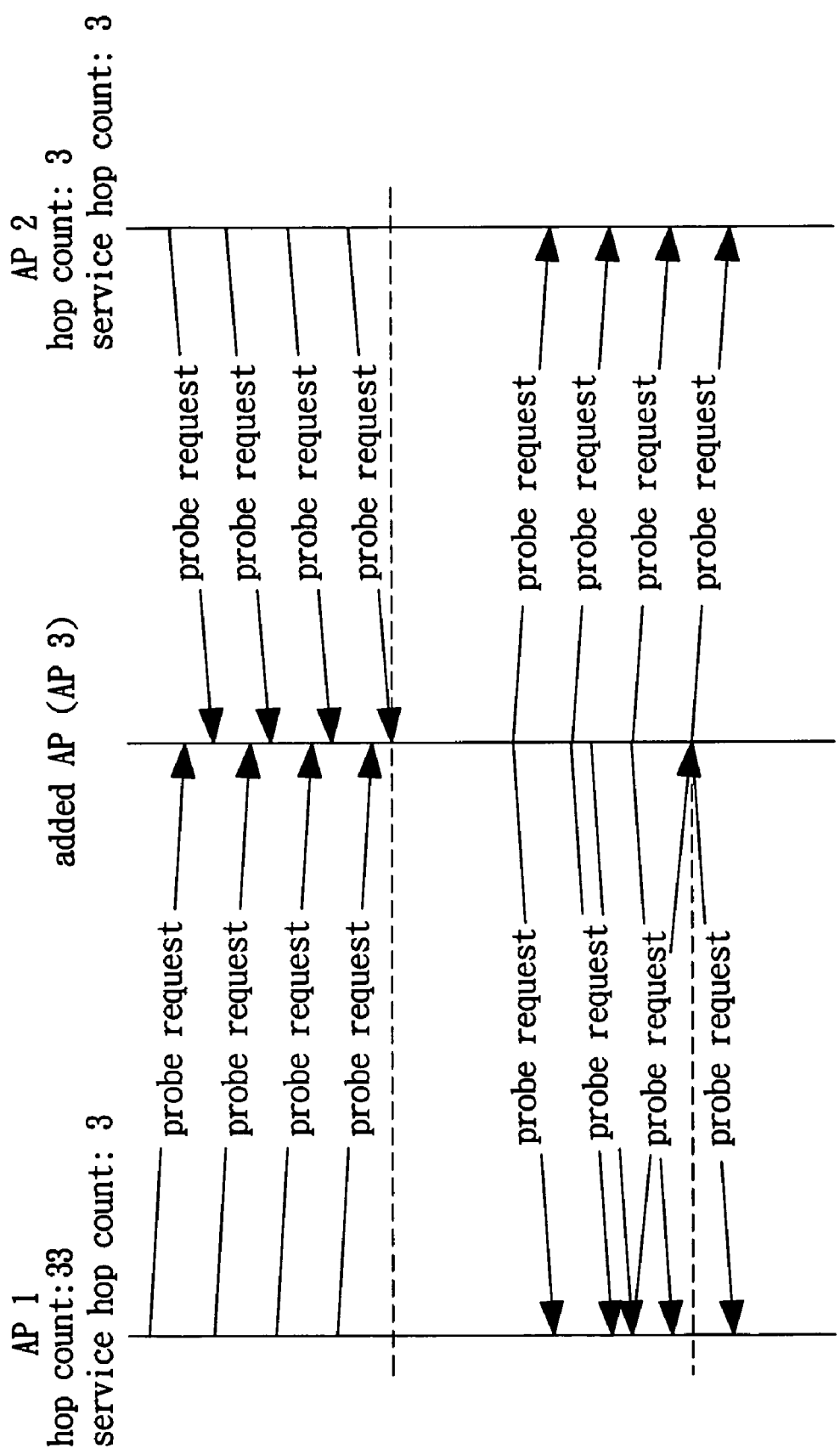
FIG. 5 presents a feasible signaling in adding an AP 3 to a wireless meshing network according to the invention.

Referring to FIG. 5, it presents a feasible signaling in adding an AP 3 to a wireless meshing network according to the invention. A signal communication range of AP 3 is partially overlapped with both AP 1 and AP 2. At this time, AP 3 is able to receive a probe request packet from each of AP 1 and AP 2. Thus, AP 3 is aware of the current hop count and service hop count of each of the AP 1 and AP 2 based on hop count field and service hop count field contained in the probe request packet. Such information is helpful for determining load and link conditions of each of AP 1 and AP 2 and thus for selecting a preferred AP to establish a link therewith. Also, a bidirectional link is established with an AP desired to establish a link by sending back a probe response packet. As shown in FIG. 5, for example, AP 1 is selected by AP 3 for establishing a link. After receiving a probe request packet from AP 3, AP 1 is able to determine whether a link to AP 3 can be established or not based on information contained in the probe request packet. If yes, AP 1 sends a probe response packet to AP 3. As a result, a link between AP 1 and AP 3 is established. By configuring as above, a preferred path can be created based on the current load prior to establishing a link between two different APs. As an end, complexity of a wireless meshing network is greatly decreased and a desired balance between the meshing and the load is obtained.

Figure 6:
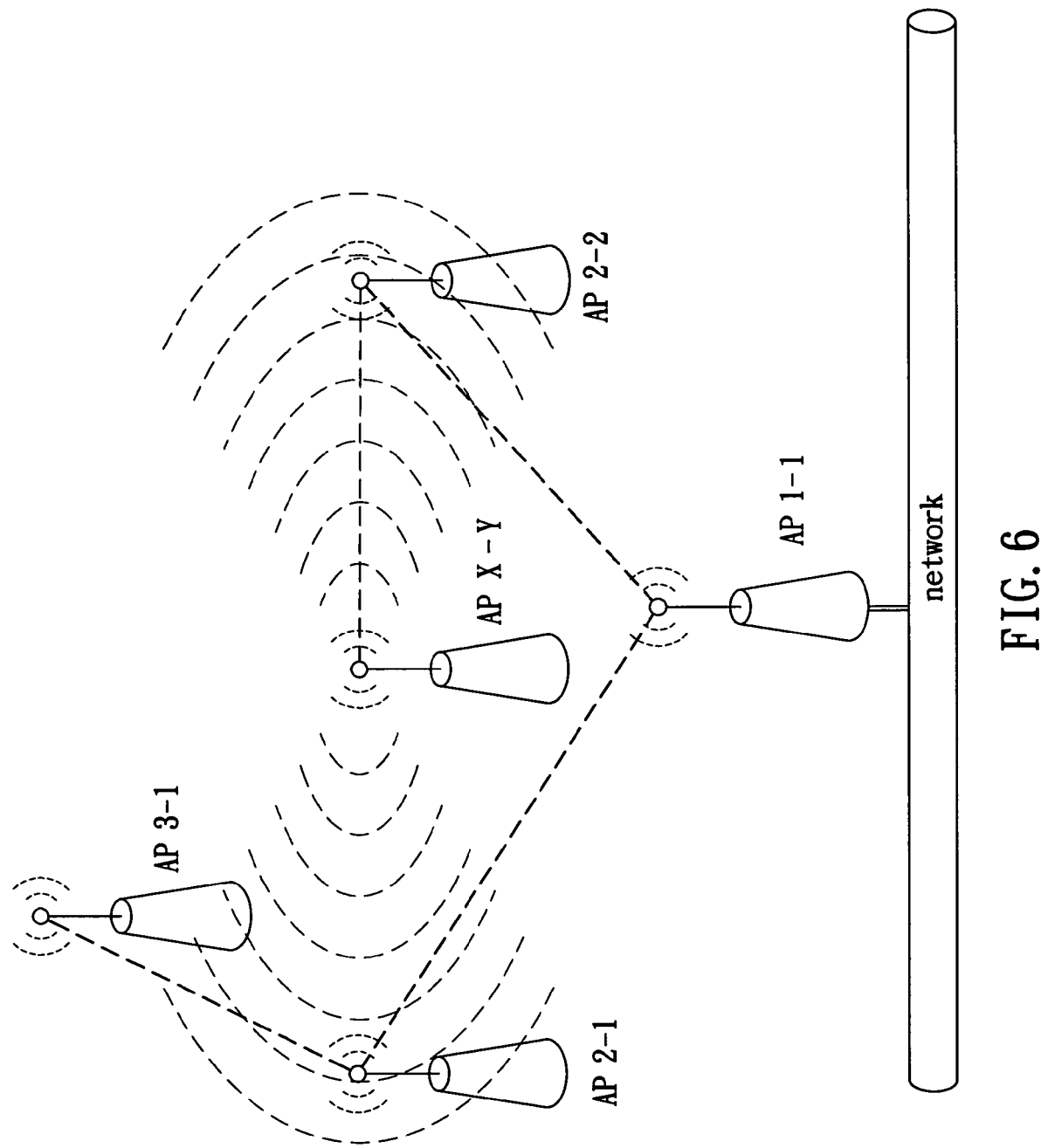
FIG. 6 schematically depicts wireless links among a plurality of APs in a wireless meshing network of a first preferred embodiment according to the invention.

Referring to FIG. 6, it schematically depicts that an AP X-Y is about to add to a stable wireless meshing network having four (4) APs according to a first preferred embodiment of the invention. A signal communication range of the new AP X-Y is partially overlapped with both AP 2-1 and AP 2-2. Thus, AP X-Y is able to receive a probe request packet from each of AP 2-1 and AP 2-2. Also, AP X-Y is aware of value stored in each of the hop count field and the service hop count field. It is clear from FIG. 6, hop count of each of AP 2-1 and AP 2-2 is two (2), service hop count of AP 2-1 is one (1), and service hop count of AP 2-2 is zero (0). Data stored in the fields together with the probe request packet sent by both AP 2-1 and AP 2-2 are sent simultaneously. After receiving and being aware of values stored in the fields, AP X-Y can immediately determine that the value of an optimal hop count is 2 and the value of an optimal service hop count is 0 respectively. Further, AP X-Y is able to select AP 2-2 having a light load and simple meshing as one for establishing a wireless meshing network having a balance load.

Figure 7:
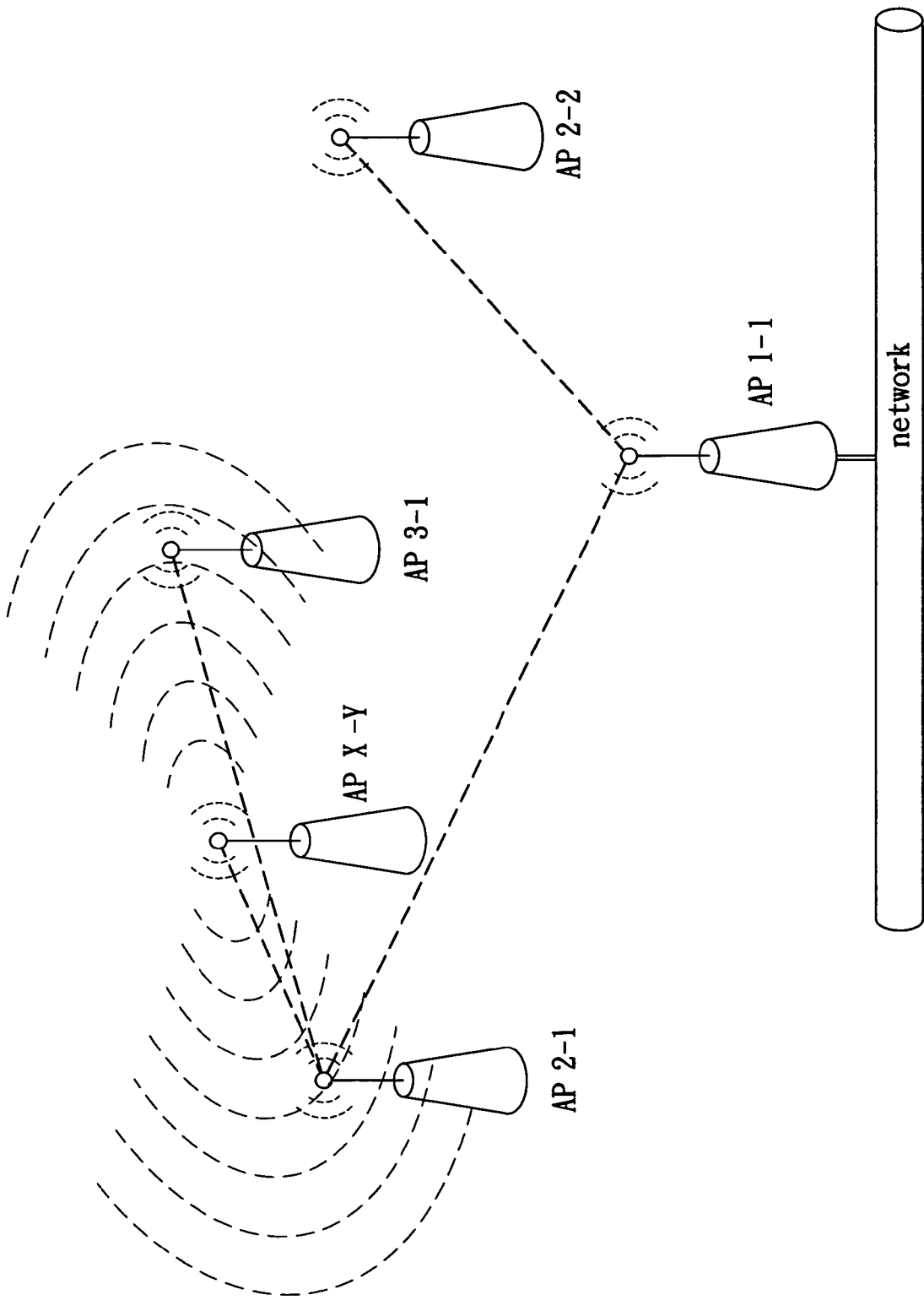
FIG. 7 schematically depicts wireless links among a plurality of APs in a wireless meshing network of a second preferred embodiment according to the invention.

Referring to FIG. 7, it schematically depicts that an AP X-Y is about to add to a stable wireless meshing network having four (4) APs according to a second preferred embodiment of the invention. A signal communication range of the new AP X-Y is partially overlapped with both AP 2-1 and AP 3-1. Thus, AP X-Y is able to receive a probe request packet from each of AP 2-1 and AP 3-1. Also, AP X-Y is aware of value stored in each of the hop count field and the service hop count field. It is clear from FIG. 7, hop count of AP 2-1 is two (2), hop count of AP 3-1 is three (3), service hop count of AP 2-1 is one (1), and service hop count of AP 3-1 is zero (0). Data stored in the fields together with the probe request packet sent by both AP 2-1 and AP 3-1 are sent simultaneously. After receiving and being aware of values stored in the fields, AP X-Y can immediately determine that AP 2-1 has a hop count of two (2) and which is an optimal hop count. Thus, AP X-Y selects AP 2-1 having less hop count to connect and AP 2-1 is further connected to a wire network. A wireless link with AP 3-1 is not established in consideration of network load. As a result, an effective and simple wireless meshing network is provided.

Figure 8:
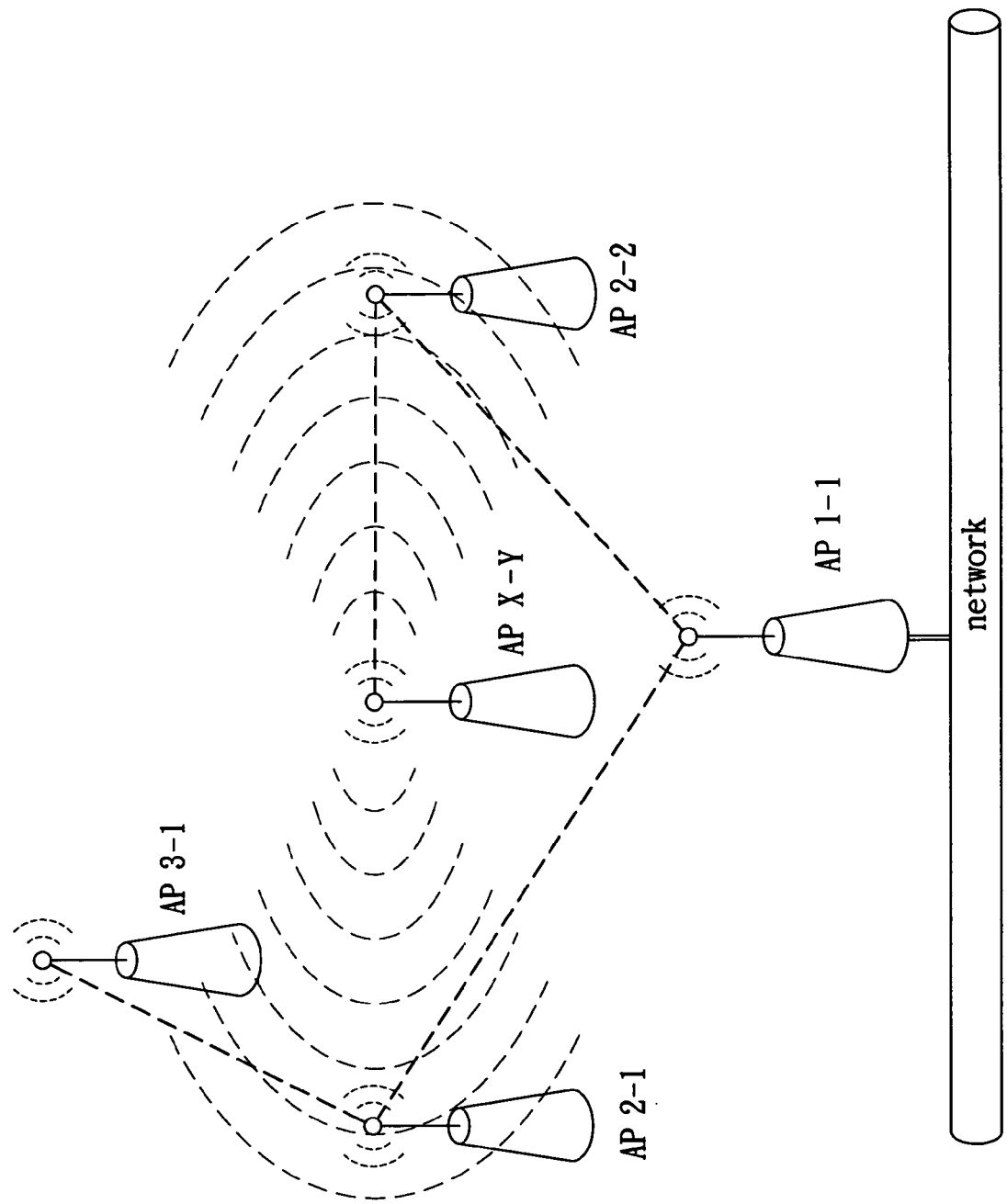
FIG. 8 schematically depicts wireless links among a plurality of APs in a wireless meshing network of a third preferred embodiment according to the invention.

Referring to FIG. 8, it schematically depicts that an AP X-Y is about to add to a stable wireless meshing network having four (4) APs according to a third preferred embodiment of the invention. A signal communication range of the new AP X-Y is partially overlapped with AP 2-1, AP 2-2, and AP 3-1. Thus, AP X-Y is able to receive a probe request packet from each of AP 2-1, AP 2-2, and AP 3-1.

Also, AP X-Y is aware of value stored in each of the hop count field and the service hop count field. It is clear from FIG. 8, hop count of AP 2-1 is two (2), hop count of AP 3-1 is three (3), hop count of AP 2-2 is two (2), service hop count of AP 2-1 is one (1), service hop count of AP 3-1 is zero (0), and service hop count of AP 2-2 is zero (0). After receiving a probe request packet from each of AP 2-1, AP 2-2, and AP 3-1 and being aware of values stored in hop count fields and service hop count fields (see FIG. 8), AP X-Y can immediately determine that AP 2-1 has a hop count of two (2), AP 3-1 has a hop count of three (3), AP 2-2 has a hop count of two (2), AP 2-1 has a service hop count of one (1) AP 3-1 has a service hop count of zero (0), and AP 2-2 has a service hop count of zero (0). Data stored in the fields together with the probe request packet sent by AP 2-1, AP 2-2, and AP 3-1 is sent simultaneously. As contemplated by the invention, the added AP X-Y selects AP 2-2 having less hop count and service hop count to connect and AP 2-2 is further connected to a wire network. A wireless link with either AP 2-1 or AP 3-1 is not established in consideration of network load. As a result, an effective and simple wireless meshing network is provided.

Figure 9:
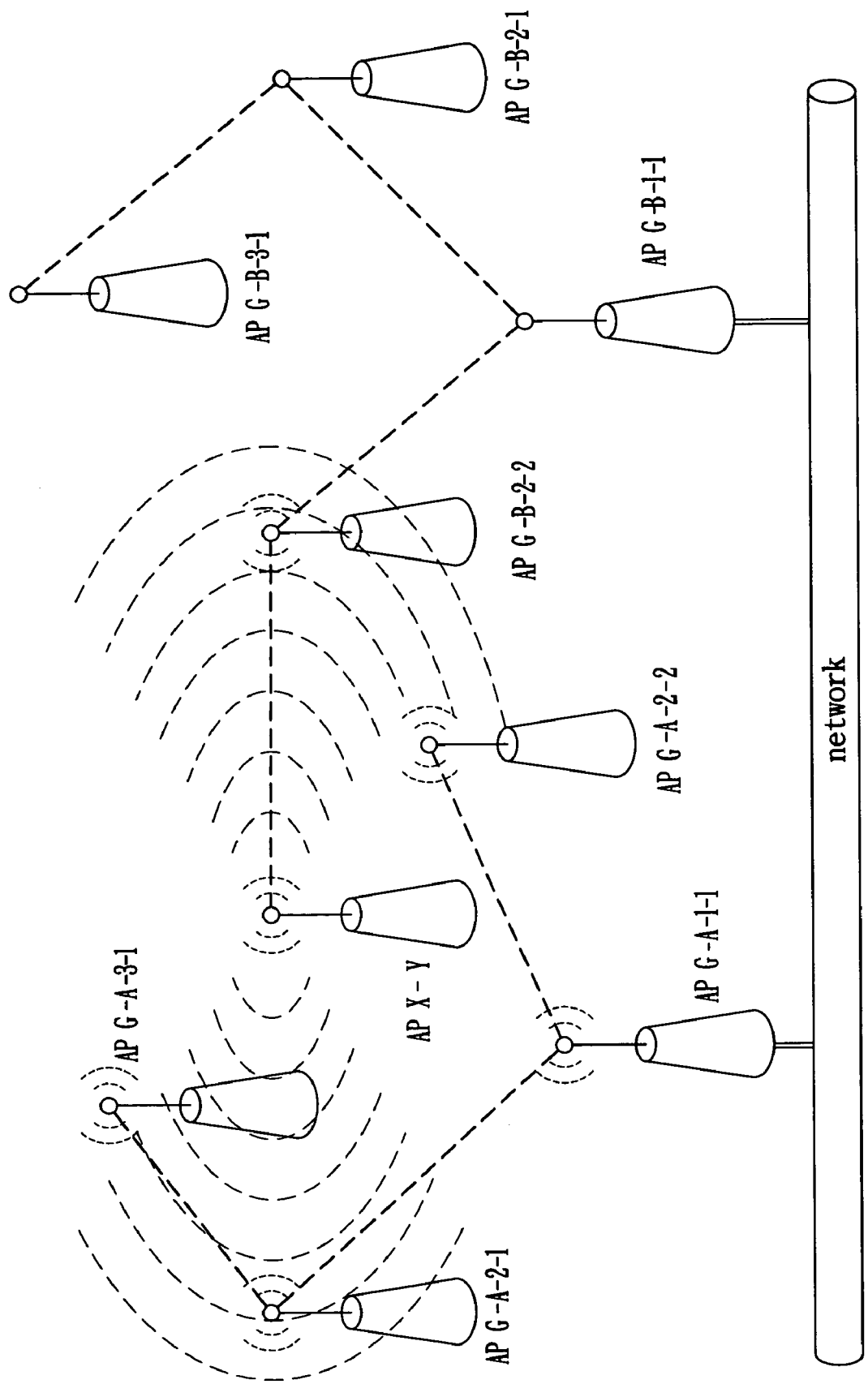
FIG. 9 schematically depicts wireless links among a plurality of APs in a wireless meshing network of a fourth preferred embodiment according to the invention.

Referring to FIG. 9, it schematically depicts that there are two stable wireless meshing networks connected to a wire network in which one wireless meshing (e.g., group A) consists of AP G-A-1-1, AP G-A-2-1, AP G-A-2-2, and AP G-A-3-1, and the other wireless meshing (e.g., group B) consists of AP G-B-1-1, AP G-B-2-1, AP G-B-2-2, and AP G-B-3-1, and an AP X-Y is about to add to each of the wireless meshing networks according to a fourth preferred embodiment of the invention. A signal communication range of the new AP X-Y is partially overlapped with AP G-A-2-1, AP G-A-2-2, AP G-A-3-1, and AP G-B-2-2. But AP X-Y is not required to join group A or B by setting. In consideration of above implementations in the embodiments of the invention, each of AP G-A-2-2 and AP G-B-2-2 has a hop count of 2 and a service hop count of 0 and they are less than hop count and service hop count of other APs respectively. But the former can provide identical and preferred link. Thus, the added AP X-Y selects AP G-A-2-2 or AP G-B-2-2 to connect and AP 2-2 is further connected to a wire network. Also, the added AP X-Y can determine whether a wireless link should be established or not based on RunOutofVport field in the received IE. A real time network flow as indicated by RunOutofVport field in the IE is provided to an AP by performing the above mode II if the AP is able to establish a link. The added AP X-Y is thus able to determine whether a link should be established or not based on the real time network flow. The added AP X-Y is aware that network flow between AP G-A-1-1 and AP G-A-2-2 is large based on the received probe request packet and the added AP X-Y is thus able to determine that a wide bandwidth can be provided by AP G-B-2-2. Thereafter, the added AP X-Y will establish a wireless link with AP G-B-2-2 only.

Referring to FIG. 9 again, in the fourth preferred embodiment of the invention the load between group A and group B is light. For the added AP X-Y, thus both AP G-A-1-1 and AP G-A-2-2 provide substantially the same link conditions. However, signals from either AP G-A-1-1 or AP G-A-2-2 received by the added AP X-Y may be not the same. Thus, the added AP X-Y may select a preferred AP as one for establishing a link therewith based on difference of the received signals. In view of above, the invention not only has the capability of supporting flow control in a wireless meshing network but also has the capability of enabling the wireless meshing network to establish a link based on the flow in response to network flow difference, and thereby balancing the wireless meshing network. Alternatively, a link to a wireless meshing network is established or not can be determined by signal strength.

Figure 10:
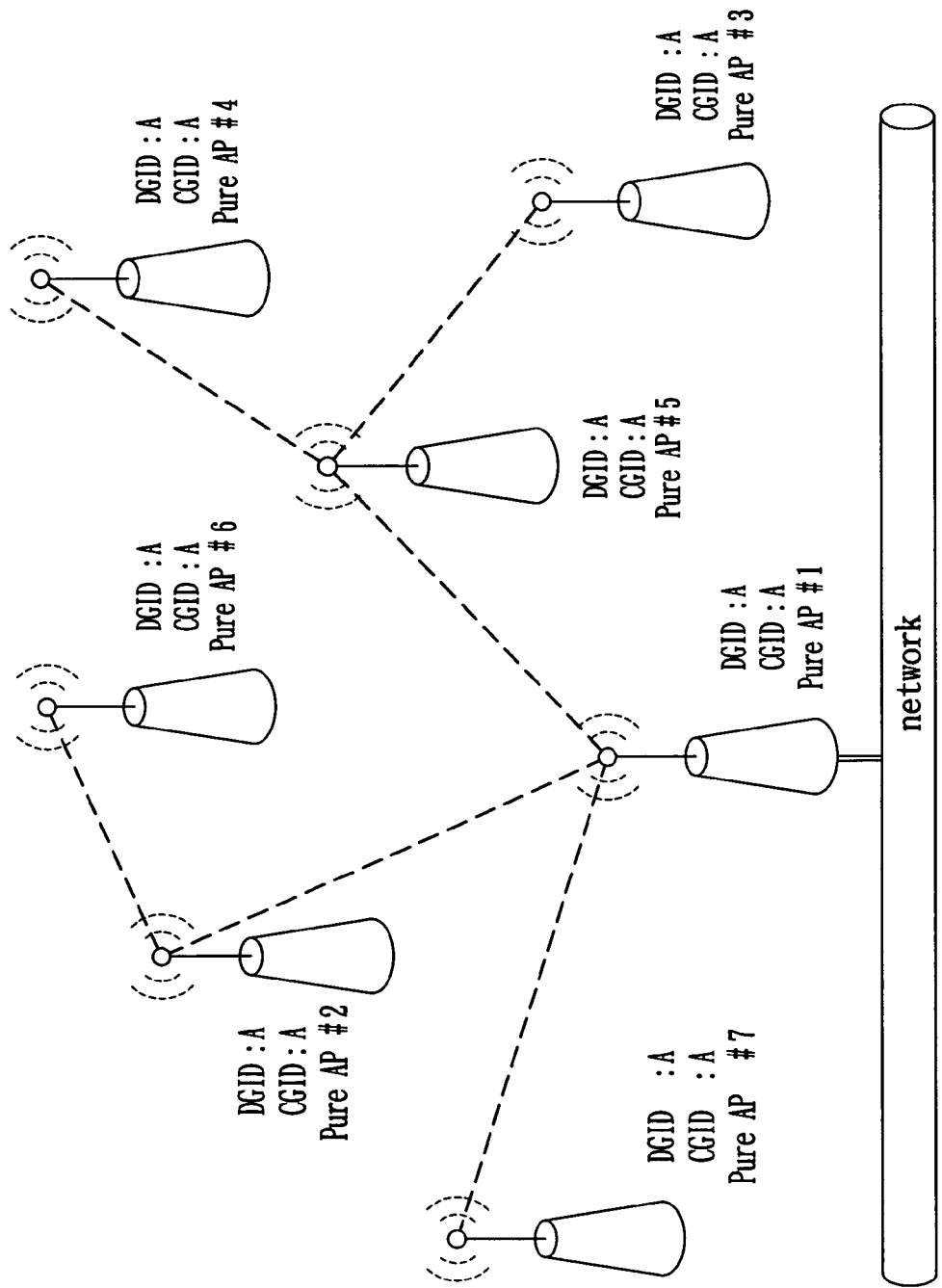
FIG. 10 schematically depicts wireless links among a plurality of APs in a wireless meshing network of a fifth preferred embodiment according to the invention.
Figure 11:
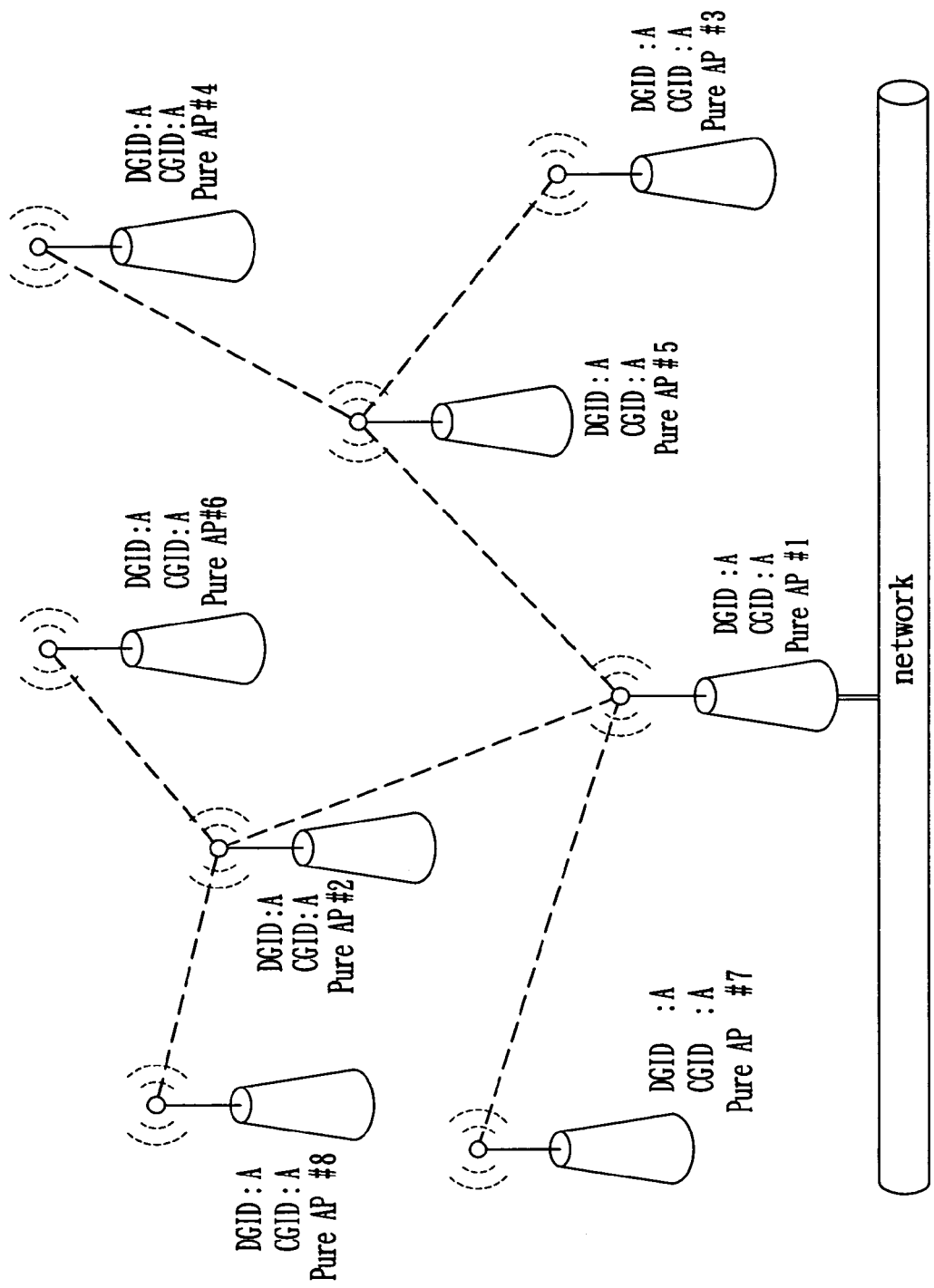
FIG. 11 schematically depicts wireless links in the structure of the wireless meshing network in FIG. 10 where an AP #8 is added thereto.

Referring to FIG. 10, it shows a fifth preferred embodiment of the invention. A resulting profile of a meshing in a single group environment is shown. In the embodiment, a user may selectively set a maximum number of wireless links with respect to each AP. The maximum number of wireless links is a default value of the network if no setting is made by the user. Also, the maximum number of wireless links with respect to one AP may be different from that with respect to the other AP. As shown in FIG. 10, it is assumed that the maximum number of wireless links with respect to AP #7 is set as one (1). That is, AP #7 does not provide link services to subsequent APs. Referring to FIG. 11, it shows that a new AP #8 is added to the meshing in FIG. 10. A signal communication range of the added AP #8 is partially overlapped with both AP #2 and AP #7. Previously, AP #8 may select AP #7 having less service hop count as one to establish a link therewith in response to receiving a probe request packet from each of AP #2 and AP #7. However, the number of wireless links with respect to AP #7 is a maximum (i.e., new wireless link is not possible) as indicated by RunOutofVport field in a probe request packet sent by AP #7. As a result, AP #8 is prohibited from establishing a wireless link with AP #7. To the contrary, AP #8 establishes a wireless link with AP #2 (see FIG. 11). It is clear that the invention can limit or average the number of wireless links with respect to an AP by setting the number of wireless links based on respective AP characteristics and needs. As a result, load is balanced, bandwidth is effectively employed, and even a certain AP not providing link services to subsequent APs is satisfied.

Figure 12:
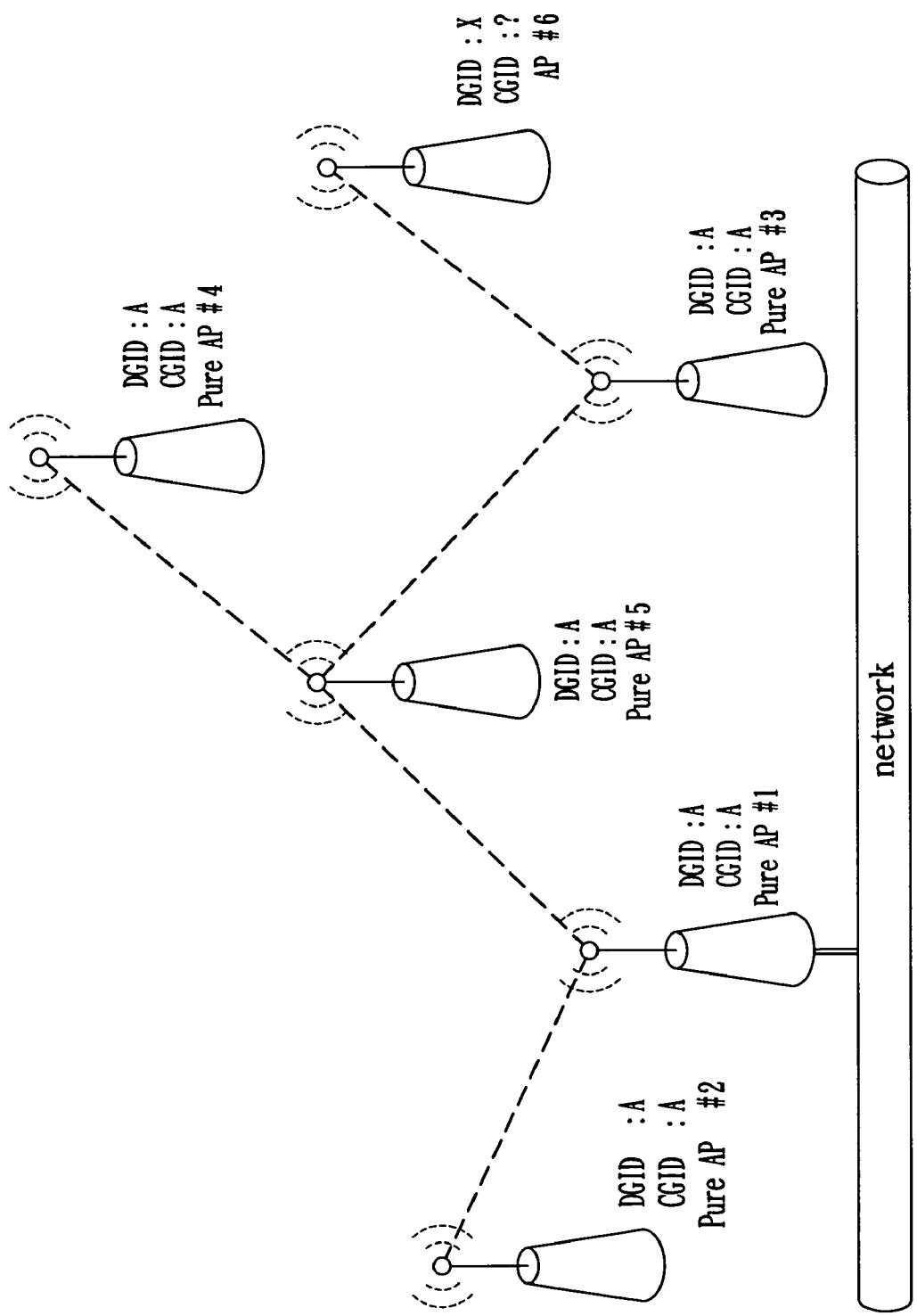
FIG. 12 schematically depicts wireless links among a plurality of APs in a wireless meshing network of a sixth preferred embodiment according to the invention.

Referring to FIG. 12, it shows a sixth preferred embodiment of the invention. Pure AP #1, pure AP #2, pure AP #3, pure AP #4, and pure AP #5 form a single group (i.e., Group ID equal to A) with stable meshing in which only pure AP #4 is set as one not allowing APs of other groups to establish a link therewith in escape mode, and the remaining pure APs are set as ones allowing APs of other groups to establish a link therewith in escape mode. In FIG. 12, pure AP #6 is an AP that desires to join group A in escape mode. Also, pure AP #6 is in partial signal coverage with both pure AP #3 and pure AP #4. Now AP #6 desires to establish a link with AP #4 by negotiation. But AP #4 has been set as one not allowing APs of other groups to establish a link therewith in escape mode. Thus, AP #6 is determined to be an AP that desires to join group A in escape mode after AP #4 has received a probe request packet from AP #6 and DGID stored in the probe request packet is not "A" by analysis. Therefore, a link between AP #4 and AP #6 will not be established. Also, AP #6 receives a probe request packet from AP #4. Value stored in escape field is also known by analysis. Thus, a link between AP #4 and AP #6 will not be established. In the embodiment, AP #3 is not restricted by the above rules. Thus, a link between AP #4 and AP #6 will be established successfully. Eventually, AP #6 joins group A in escape mode. And in turn, group A is connected to a wire network (i.e., AP #6 is connected to the wire network). It is clear that the invention enables respective APs to select a counterpart to be serviced. That is, APs with different attributes have the right to select a counterpart to be serviced.

Figure 13:
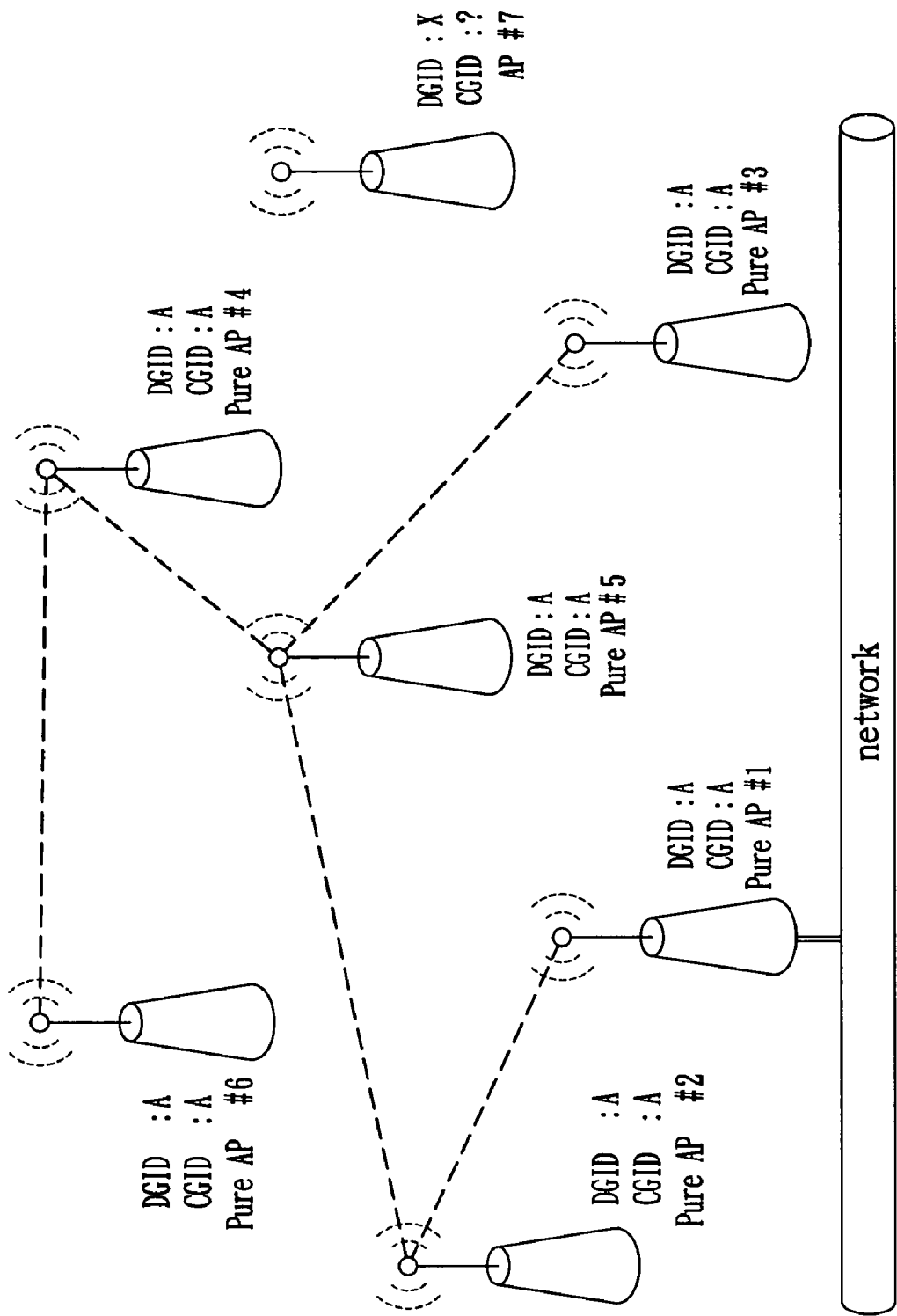
FIG. 13 schematically depicts wireless links among a plurality of APs in a wireless meshing network of a seventh preferred embodiment according to the invention.

Referring to FIG. 13, it shows a seventh preferred embodiment of the invention. Pure AP #1, pure AP #2, pure AP #3, pure AP #4, pure AP #5, and pure AP #6 form a single group (i.e., Group ID equal to A) with stable meshing in which only pure AP #4 is set as one not allowing APs of other groups to establish a link therewith in escape mode, and the remaining pure APs are set as ones allowing APs of other groups to establish a link therewith in escape mode. The invention has implemented a special mechanism for configuring a network of group A to be a private wireless meshing network having setting convenience. Also, other pure APs are aware that all APs in group A are not allowed to establish a link with APs in escape mode and such information is stored in escape field prior to sending in a probe request packet by referring to escape field in an IE contained in a probe request packet sent from a root AP when a root AP in group A is set as one not allowing APs of other groups to establish a link therewith in escape mode. In such a manner, AP #1, AP #2, AP #3, AP #4, AP # 5, and AP #6 are aware that APs in group A are not allowed to establish a link therewith in escape mode. Thus, AP #7 is still not allowed to establish a link with both AP #3 and AP #4 even AP #7 is in partial signal coverage with both AP #3 and AP #4 in group A. Both pure AP #3 and pure AP #4 are stable APs. This means that both pure AP #3 and pure AP #4 have directly or indirectly received information indicating that the root AP has been set as one not allowing APs of other groups to establish a link therewith in escape mode. Thus, a link between AP #3 or AP #4 and AP #7 will not be established in escape mode. Eventually, group A forms a private, stable wireless meshing network and will not establish a link with other APs in escape mode. In view of above, a simple setting is configured by the invention for commanding all APs in a single group not to provide services to APs with different attributes in order to ensure that a private wireless meshing network is formed.

Figure 14:
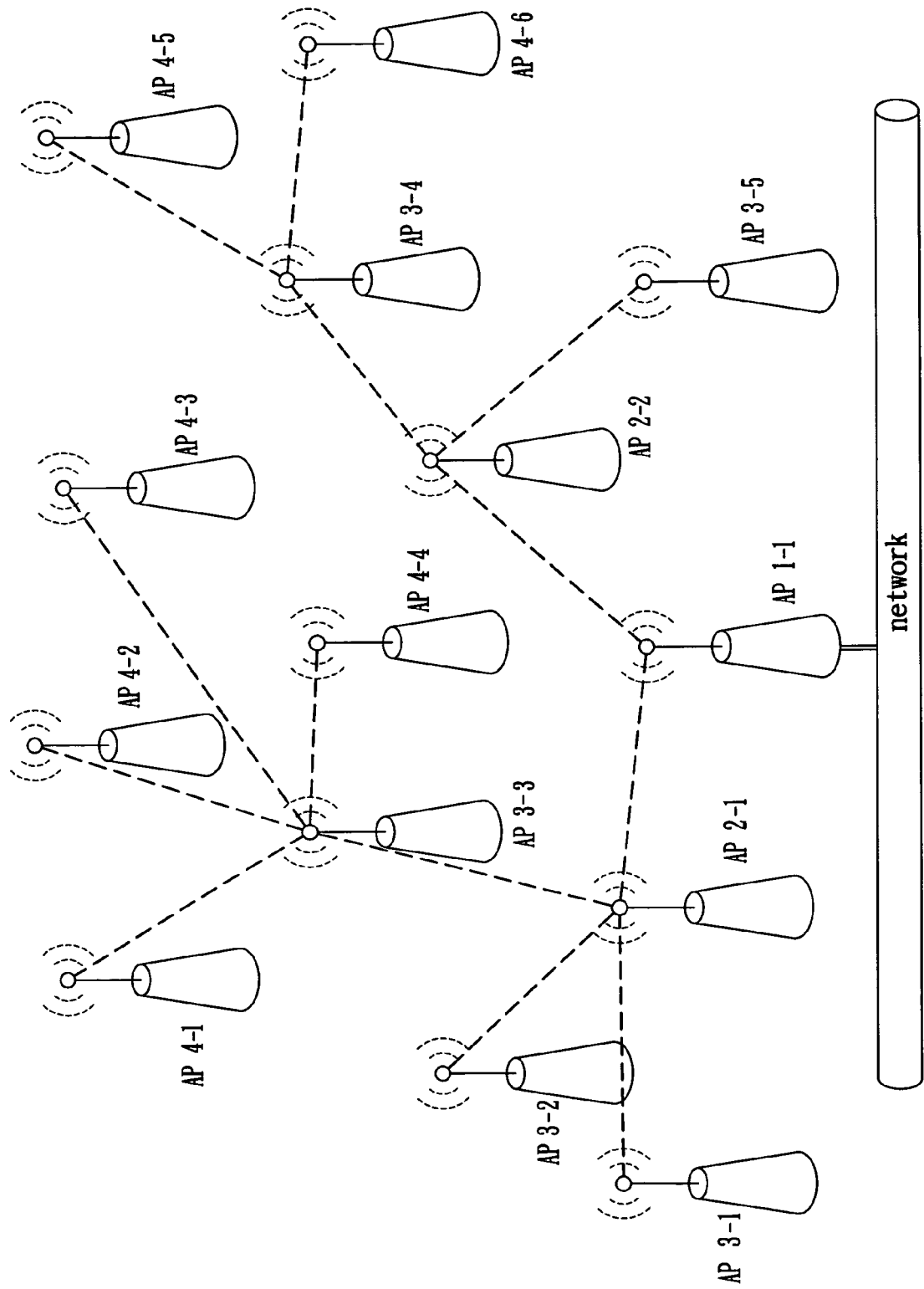
FIG. 14 schematically depicts wireless links among a plurality of APs in a wireless meshing network of an eighth preferred embodiment according to the invention.
Figure 15:
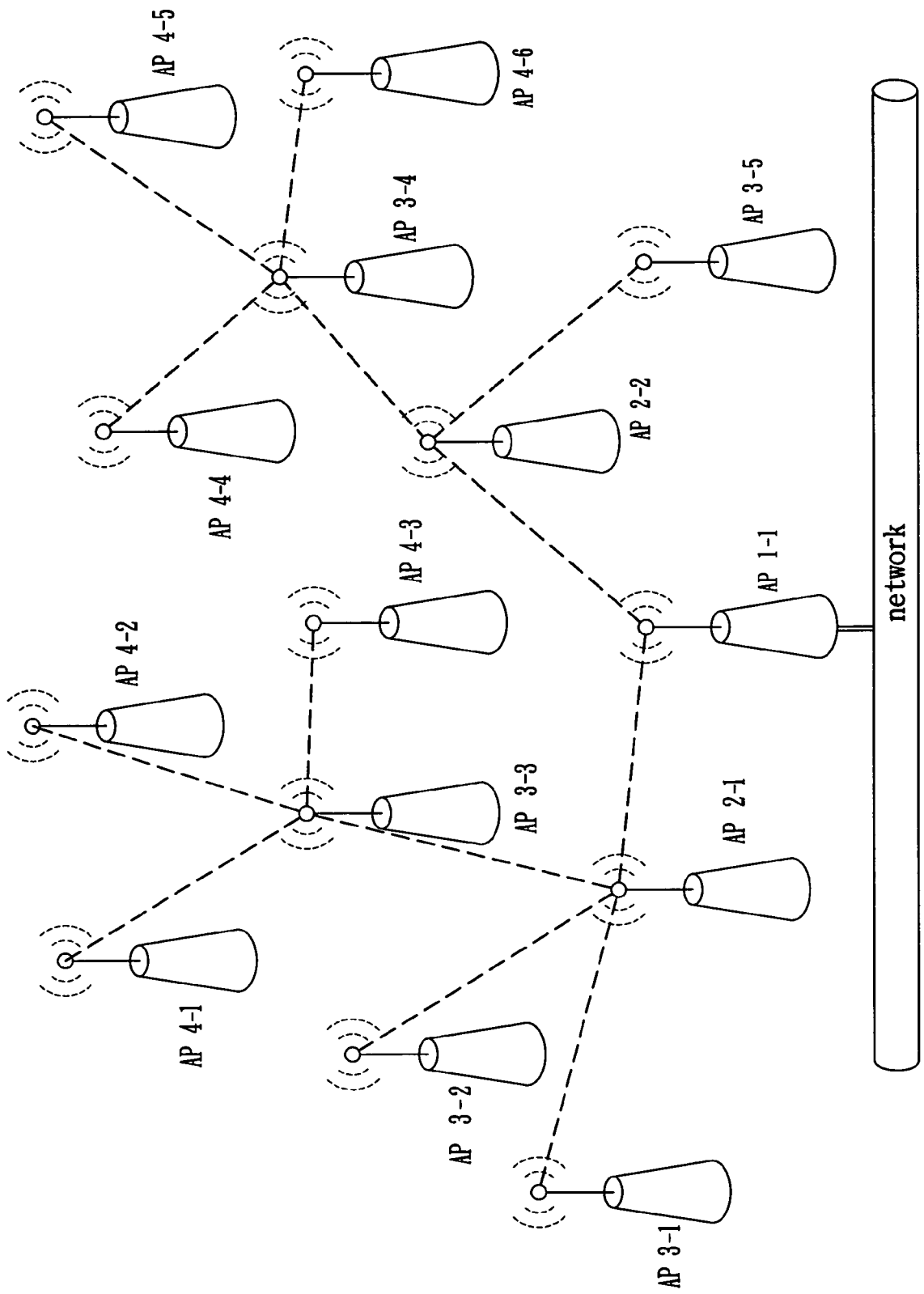
FIG. 15 schematically depicts wireless links in the structure of the wireless meshing network in FIG. 14 where a new wireless meshing network is established by moving AP 4-4 to be in partial signal coverage with AP 3-4.

Referring to FIG. 14, it shows an eighth preferred embodiment of the invention. A stable wireless meshing network is shown. AP 3-3 is in partial signal coverage with both AP 2-1 and AP 2-2. Thus, AP 3-3 may select to establish a link with either AP 2-1 or AP 2-2 for joining a meshing depending on the meshing. Eventually, AP 3-3 selects to establish a link with AP 2-1. Thereafter, AP 3-3 establishes a wireless link with each of AP 4-1, AP 4-2, AP 4-3, and AP 4-4. The adjacent AP 3-4 establishes a link with each of AP 4-5 and AP 4-6. Each of AP 4-1, AP 4-2, AP 4-3, and AP 4-4 is in partial signal coverage with AP 3-3. Thus, each of AP 4-1, AP 4-2, AP 4-3, and AP 4-4 selects to establish a link with AP 3-3 only. AP 3-3 may be aware that there are fewer subsequent APs to be serviced by AP 3-4 if both AP 3-3 and AP 4-4 are in partial signal coverage. Hence, AP 3-3 may refuse to establish a link with the subsequent APs to be serviced by AP 3-4. For solving the problem, a unique selection link field is added in a negotiation packet by the invention. The unique selection link field is adapted to represent that there is a unique AP having a minimum value of a hop count field in all other APs within a signal communication range of a specific AP. For example, AP 4-4 is in partial signal coverage with each of AP 4-2, AP 4-3, and AP 3-3. But only AP 3-3 having a minimum hop count is one possible of establishing a link with AP 4-4. Thus, the unique selection link field is required to enable when AP 4-4 desires to establish a wireless link with AP 3-3. In a negotiation phase, AP 3-3 will be informed by the enabled unique selection link field that AP 4-4 will not broadcast a probe request packet. Instead, a MAC address of a specific AP to be linked is required to fill in the unique selection link field. Therefore, AP 3-3 may establish a link with AP 4-4. Further, AP 4-4 may be in partial signal coverage with AP 3-4 again due to movement. At this time, the unique selection link field associated with AP 4-4 will not be enabled. Also, a link between AP 4-4 and AP 3-3 is interrupted when AP 4-4 is aware that there are fewer subsequent APs to be serviced by AP 3-4. Further, a wireless link between AP 4-4 and AP 3-4 is established in order to form a new wireless meshing network (see FIG. 15). In view of above, signal coverage of subsequent APs of a specific AP and AP movement characteristics are considered by the invention in order to provide a balanced service.

Figure 16:
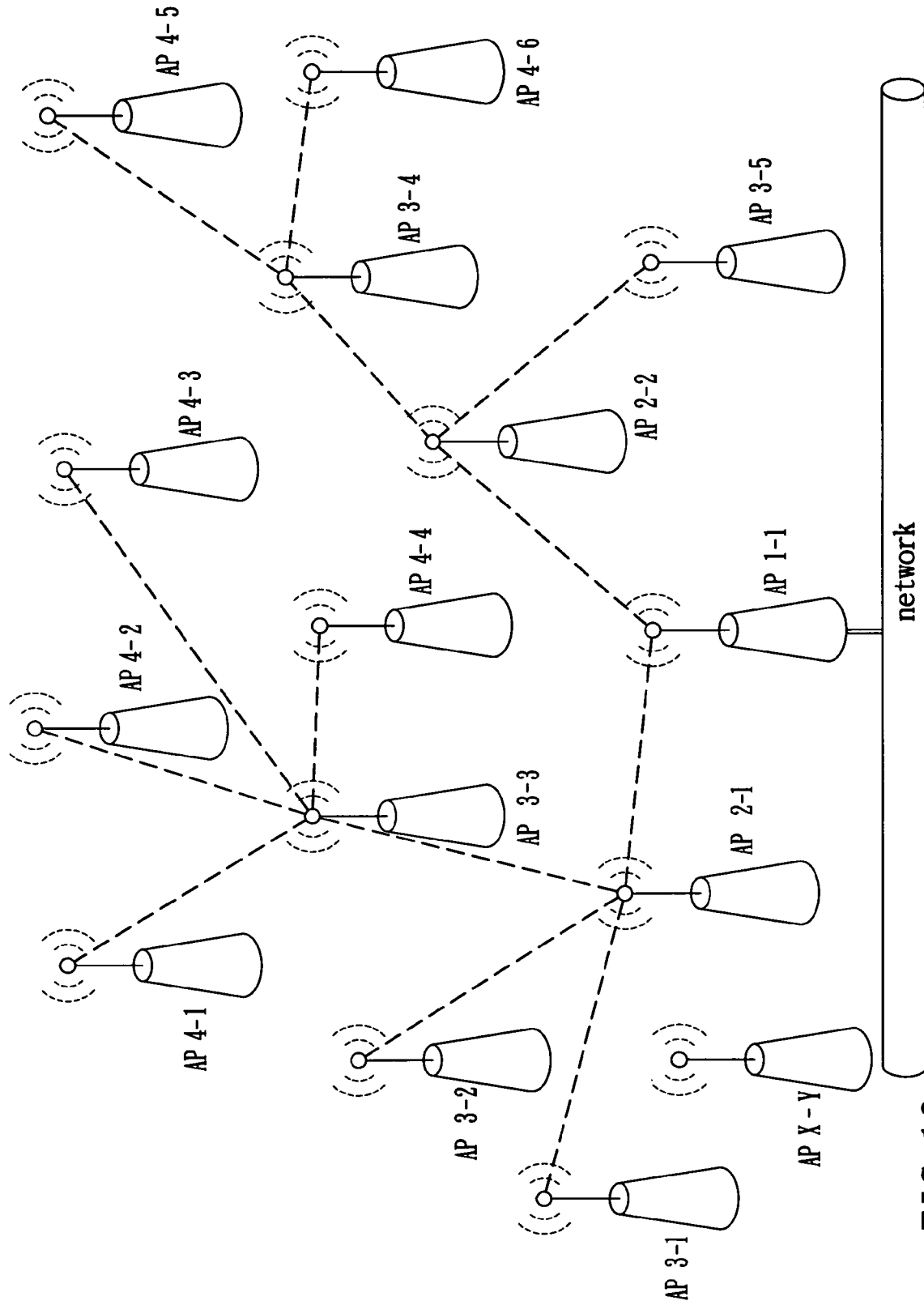
FIG. 16 schematically depicts wireless links in the structure of the wireless meshing network in FIG. 14 where an AP X-Y is added thereto.
Figure 17:
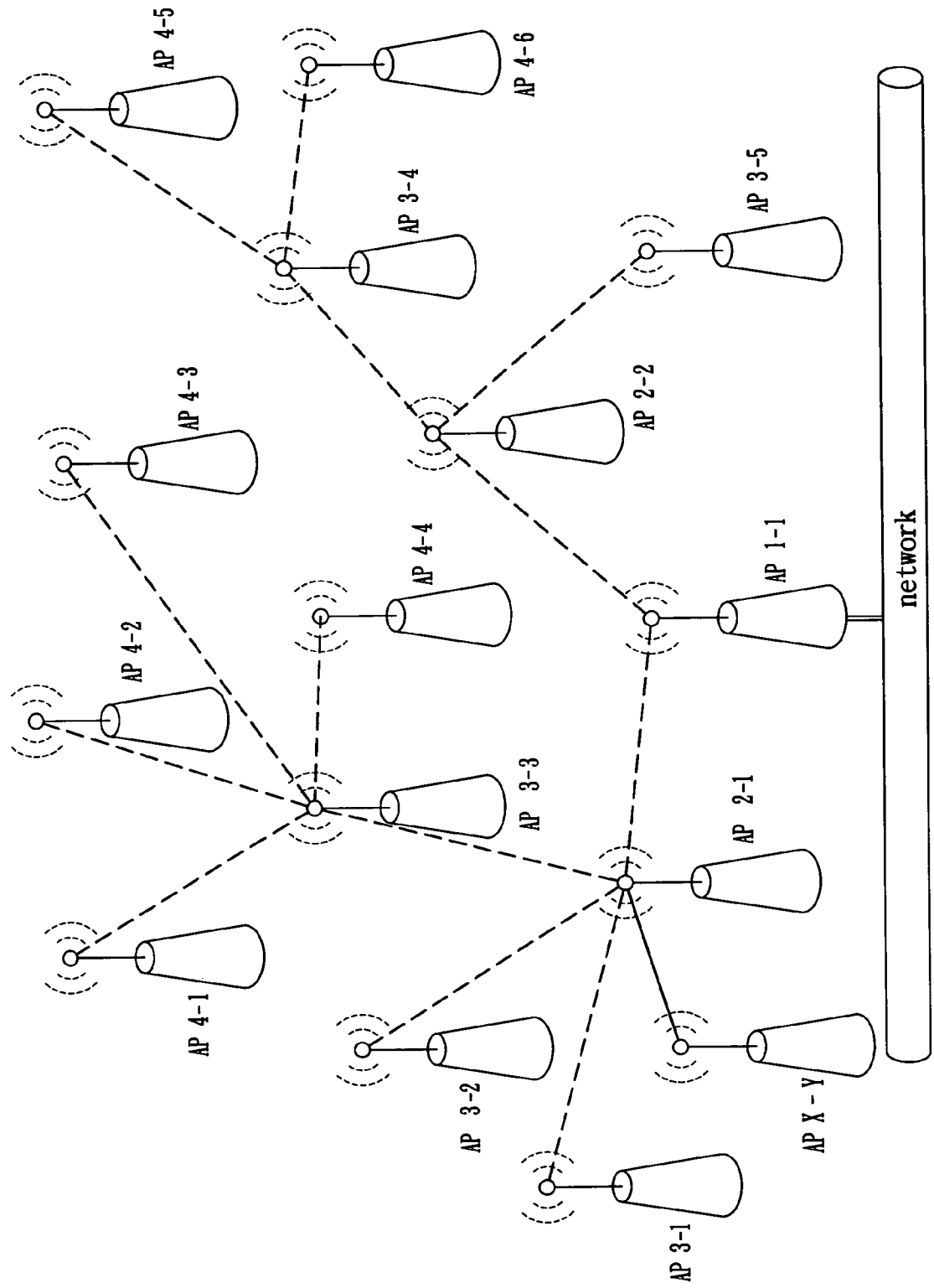
FIG. 17 schematically depicts wireless links in the structure of the wireless meshing network in FIG. 14 where the added AP X-Y has established a link to the wireless meshing network.

Referring to FIG. 14 again, in the eighth preferred embodiment a new AP X-Y is about to enter the wireless meshing network. This is best shown in FIG. 16 in which AP 2-1 has a minimum value of a hop count field in all other APs within a signal communication range of the new AP X-Y Referring to FIG. 17, the new AP X-Y thus selects to establish a link with AP 2-1 and the unique selection link field is enabled in the linking process. Thus, there are eight subsequent APs to be serviced by AP 2-1 when AP X-Y is connecting to AP 2-1. But only four subsequent APs are serviced by AP 2-2. An unbalanced wireless meshing network is formed at this moment and it is not desirable. A probe request packet is adapted to send cyclically. Also, AP 3-3 is in partial signal coverage with both AP 2-1 and AP 2-2. Thus, AP 3-3 may receive a link condition of both AP 2-1 and AP 2-2 in real time. Next, AP 3-3 may perform the following steps to determine whether a preferred performance can be created by linking to either AP 2-1 or AP 2-2 with a balance of network meshing being considered:

(1) AP 3-3 can receive a probe request packet sent from each of AP 2-1 and AP 2-2 when AP X-Y is connecting to AP 2-1. Also, there are eight subsequent APs to be serviced by AP 2-1 by referring to a service hop count field in the packet. But only four subsequent APs are serviced by AP 2-2. Thus, following steps are required to perform in order to determine whether a link with AP 2-1 should be interrupted and a new link with AP 2-2 should be established as a replacement.

(2) Compare condition I (i.e., service hop count difference between two APs having a minimum hop count within a signal communication range of a specific AP before linking method is changed) with condition II (i.e., service hop count difference between the same two APs having a minimum hop count within a signal communication range of the specific AP after linking method is changed). The specific AP must change its link if condition I is larger than condition II. To the contrary, no link change is required. For example, in AP 3-3 of FIG. 17 condition I is equal to four (4) and condition II is equal to six (6). Thus, a link between AP 3-3 and AP 2-1 is not required to interrupt and then a new link between AP 3-3 and AP 2-2 is not required to establish. However, link conditions of subsequent APs of AP 3-3 must be taken into consideration if a need exists of interrupting the link between AP 3-3 and AP 2-1 and establishing a new link between AP 3-3 and AP 2-2 in real time. Four subsequent APs including AP 4-1, AP 4-2, AP 4-3, and AP 4-4 of AP 3-3 are required to connect to a wire network via AP 3-3 if these four APs do not move. Thus, link between any one of AP 4-1, AP 4-2, AP 4-3, and AP 4-4 and AP 3-3 is not required to interrupt. In this regard, AP 3-3 is able to provide services to subsequent APs after waiting a very short period of time of interrupting the link and establishing a new link. As an end, the purpose of dynamically providing a balanced wireless meshing network is achieved.

While the invention herein disclosed has been described by means of specific embodiments, numerous modifications and variations could be made thereto by those skilled in the art without departing from the scope and spirit of the invention set forth in the claims.

What is claimed is:

1. A dynamic wireless meshing network for supporting load balance and flow control, the wireless meshing network being implemented in a wireless distribution system (WDS)

mode such that in response to sending a management frame having an information element (IE) from an access point (AP), each of other APs receiving the management frame is capable of automatically establishing a meshing of the wireless network in a wire network infrastructure based on information contained in a plurality of fields of the IE, the IE comprising:

an Element ID field for storing an ID of the IE;

a Length field for storing a total length of the IE;

a Current Group ID (CGID) field for representing a group ID of the AP when the wireless meshing network performs such that other APs are adapted to be aware of whether a specific group exists and operates;

a Role of AP field for representing a current role of the AP when the wireless meshing network performs;

a Sequence field for representing a sequence number of a latest available IE and for indicating an existence of a specific group;

a MACofRootAP field for representing a MAC value of a root AP in the group; and a hop count field for representing a sum of the number of wireless links and the number of wire links that the AP connected to the wire network wherein one of the wireless links and the wire links is a wire link and the remaining ones are wireless links.

2. The wireless meshing network of claim 1, wherein the IE further comprises a service hop count field for representing the number of APs not in direct connection to the wire network such that the APs are required to connect to the wire network via a service provided by the AP, and wherein the number of the APs not in direct connection to the wire network is the service hop count of the AP.

3. The wireless meshing network of claim 2, wherein the IE further comprises a RunOutofVport field for representing whether the AP is capable of establishing one or more physical wireless links.

4. The wireless meshing network of claim 3, wherein the IE further comprises a unique selection link field for representing that there is a unique AP having a minimum value of a hop count field in all other APs within a signal communication range of the AP.

5. The wireless meshing network of claim 4, wherein a value of the hop count field comprises:

an optimal hop count for representing an optimal value of a hop count when the AP is in a ready state but not establishing a link with a minimum hop count contained in a received packet being stored in the hop count field when the AP is in its signal communication range; or a current hop count for representing a value of the current hop count when the AP is in a stable state establishing a link.

6. The wireless meshing network of claim 5, wherein the IE further comprises a Default Group ID (DGID) field for representing a group ID of a group that an AP wants to join such that a plurality of different APs with the same DGID have the highest priority of establishing a wireless link therebetween.

7. The wireless meshing network of claim 6, wherein the IE further comprises an Escape field for representing whether an AP is capable of accepting to establish a wireless link with another AP having a different DGID.

8. The wireless meshing network of claim 7, wherein the Escape field is adapted to represent an acceptable escape mode, an unacceptable escape mode, or all APs in the same group are in the unacceptable escape mode.

9. The wireless meshing network of claim 4, wherein a value of the service hop count field comprises:

an optimal service hop count for representing an optimal value of a service hop count of all APs having an optimal hop count when the AP is in a ready state but not establishing a link; or a current service hop count for representing a value of the current service hop count when the AP is in a stable state establishing a link.

10. The wireless meshing network of claim 9, wherein the IE further comprises a Default Group ID (DGID) field for representing a group ID of a group that an AP wants to join such that a plurality of different APs with the same DGID have the highest priority of establishing a wireless link therebetween.

11. The wireless meshing network of claim 10, wherein the IE further comprises an Escape field for representing whether an AP is capable of accepting to establish a wireless link with another AP having a different DGID.

12. The wireless meshing network of claim 11, wherein the Escape field is adapted to represent an acceptable escape mode, an unacceptable escape mode, or all APs in the same group are in the unacceptable escape mode.

13. The wireless meshing network of claim 4, wherein a value of the RunOutofVport field comprises:

a first mode of not allowing the AP to establish a wireless link with other APs; or a second mode of allowing the AP to establish a wireless link with other APs, and wherein a real time network flow indicated by the RunOutofVport field is provided to the AP such that the other APs are capable of determining whether a link with the AP should be established based on the real time network flow.

14. The wireless meshing network of claim 13, wherein the IE further comprises a Default Group ID (DGID) field for representing a group ID of a group that an AP wants to join such that a plurality of different APs with the same DGID have the highest priority of establishing a wireless link therebetween.

15. The wireless meshing network of claim 14, wherein the IE further comprises an Escape field for representing whether an AP is capable of accepting to establish a wireless link with another AP having a different DGID.

16. The wireless meshing network of claim 15, wherein the Escape field is adapted to represent an acceptable escape mode, an unacceptable escape mode, or all APs in the same group are in the unacceptable escape mode.

17. The wireless meshing network of claim 4, wherein a value of the Sequence field is adapted to enable the AP receiving the management frame to negotiate for obtaining a unique Root AP based on whether the value of the Sequence field of the IE is more senior.

18. The wireless meshing network of claim 17, wherein the IE further comprises a Default Group ID (DGID) field for representing a group ID of a group that an AP wants to join such that a plurality of different APs with the same DGID have the highest priority of establishing a wireless link therebetween.

19. The wireless meshing network of claim 18, wherein the IE further comprises an Escape field for representing whether an AP is capable of accepting to establish a wireless link with another AP having a different DGID.

20. The wireless meshing network of claim 19, wherein the Escape field is adapted to represent an acceptable escape mode, an unacceptable escape mode, or all APs in the same group are in the unacceptable escape mode.

21. The wireless meshing network of claim 4, wherein the Role of AP field is a Hello field for representing which role of an AP is when the AP is sending the IE.

22. The wireless meshing network of claim 21, wherein the IE further comprises a Default Group ID (DGID) field for representing a group ID of a group that an AP wants to join such that a plurality of different APs with the same DGID have the highest priority of establishing a wireless link therebetween.

23. The wireless meshing network of claim 22, wherein the IE further comprises an Escape field for representing whether an AP is capable of accepting to establish a wireless link with another AP having a different DGID.

24. The wireless meshing network of claim 23, wherein the Escape field is adapted to represent an acceptable escape mode, an unacceptable escape mode, or all APs in the same group are in the unacceptable escape mode.

25. The wireless meshing network of claim 4, wherein an AP sending the management frame is adapted to maintain the value of each field of the IE based on setting and state of the AP.

26. The wireless meshing network of claim 25, wherein the IE further comprises a Default Group ID (DGID) field for representing a group ID of a group that an AP wants to join such that a plurality of different APs with the same DGID have the highest priority of establishing a wireless link therebetween.

27. The wireless meshing network of claim 26, wherein the IE further comprises an Escape field for representing whether an AP is capable of accepting to establish a wireless link with another AP having a different DGID.

28. The wireless meshing network of claim 27, wherein the Escape field is adapted to represent an acceptable escape mode, an unacceptable escape mode, or all APs in the same group are in the unacceptable escape mode.

29. The wireless meshing network of claim 4, wherein the value of each field of the IE is adapted to enable an AP receiving the management frame to determine an operating state of other APs for determining whether a physical link is to be established.

30. The wireless meshing network of claim 29, wherein the IE further comprises a Default Group ID (DGID) field for representing a group ID of a group that an AP wants to join such that a plurality of different APs with the same DGID have the highest priority of establishing a wireless link therebetween.

31. The wireless meshing network of claim 30, wherein the IE further comprises an Escape field for representing whether an AP is capable of accepting to establish a wireless link with another AP having a different DGID.

32. The wireless meshing network of claim 31, wherein the Escape field is adapted to represent an acceptable escape mode, an unacceptable escape mode, or all APs in the same group are in the unacceptable escape mode.

33. The wireless meshing network of claim 4, wherein the IE further comprises a Default Group ID (DGID) field for representing a group ID of a group that an AP wants to join such that a plurality of different APs with the same DGID have the highest priority of establishing a wireless link therebetween.

34. The wireless meshing network of claim 33, wherein the IE further comprises an Escape field for representing whether an AP is capable of accepting to establish a wireless link with another AP having a different DGID.

35. The wireless meshing network of claim 34, wherein the Escape field is adapted to represent an acceptable escape mode, an unacceptable escape mode, or all APs in the same group are in the unacceptable escape mode.

36. The wireless meshing network of claim 3, wherein the IE further comprises a Default Group ID (DGID) field for representing a group ID of a group that an AP wants to join such that a plurality of different APs with the same DGID have the highest priority of establishing a wireless link therebetween.

37. The wireless meshing network of claim 36, wherein the IE further comprises an Escape field for representing whether an AP is capable of accepting to establish a wireless link with another AP having a different DGID.

38. The wireless meshing network of claim 37, wherein the Escape field is adapted to represent an acceptable escape mode, an unacceptable escape mode, or all APs in the same group are in the unacceptable escape mode.

39. The wireless meshing network of claim 2, wherein the IE further comprises a Default Group ID (DGID) field for representing a group ID of a group that an AP wants to join such that a plurality of different APs with the same DGID have the highest priority of establishing a wireless link therebetween.

40. The wireless meshing network of claim 39, wherein the IE further comprises an Escape field for representing whether an AP is capable of accepting to establish a wireless link with another AP having a different DGID.

41. The wireless meshing network of claim 40, wherein the Escape field is adapted to represent an acceptable escape mode, an unacceptable escape mode, or all APs in the same group are in the unacceptable escape mode.

42. The wireless meshing network of claim 1, wherein the IE further comprises a Default Group ID (DGID) field for representing a group ID of a group that an AP wants to join such that a plurality of different APs with the same DGID have the highest priority of establishing a wireless link therebetween.

43. The wireless meshing network of claim 30, wherein the IE further comprises an Escape field for representing whether an AP is capable of accepting to establish a wireless link with another AP having a different DGID.

44. The wireless meshing network of claim 43, wherein the Escape field is adapted to represent an acceptable escape mode, an unacceptable escape mode, or all APs in the same group are in the unacceptable escape mode.

45. A dynamic wireless meshing network for supporting load balance and flow control, and implementing a management frame in wireless network protocol for defining an access points (AP) in a wireless distribution system (WDS) mode, the management frame having an information element (IE) including a hop count field for representing a sum of the number of wireless links and the number of wire links that an AP connected to the wire network wherein an AP about to join a stable wireless meshing network is adapted to receive a management frame from one of other APs in the wireless meshing network, analyze and compare values of the hop count fields, and select an AP having a smaller hop count value as one to establish a wireless link therewith.

46. The wireless meshing network of claim 45, wherein the IE further comprises a service hop count field for representing the number of APs not in direct connection to the wire network such that the APs are required to connect to the wire network via a service provided by a predetermined AP, the number of the APs not in direct connection to the wire network is the service hop count of the predetermined AP, and the AP about to join the stable wireless meshing network is adapted to receive a management frame from one of other APs in the wireless meshing network, analyze and compare values of the service hop count fields, and select an AP having a smaller service hop count value as one to establish a wireless link therewith.

47. The wireless meshing network of claim 46, wherein the IE further comprises a RunOutofVport field for representing whether an AP is capable of establishing a wireless link, the RunOutofVport field including a first mode of not allowing the AP to establish a wireless link with other APs and a second mode of allowing the AP to establish a wireless link with other APs, and wherein a real time network flow indicated by the RunOutofVport field is provided to the AP in the second mode such that the AP about to join the stable wireless meshing network is adapted to receive a management frame from one of other APs in the wireless meshing network, analyze and compare values of the RunOutofVport fields, and select an AP having a less network flow as one to establish a wireless link therewith.

48. The wireless meshing network of claim 47, wherein the AP about to join the stable wireless meshing network is adapted to receive a management frame from one of other APs in the wireless meshing network, analyze and compare values of the hop count fields, the service hop count fields, and the RunOutofVport fields, determine that there are at least two APs having substantially the same link conditions without heavy load, and select an AP having a stronger signal based on signal strength as one to establish a wireless link therewith.

49. The wireless meshing network of claim 48, wherein the IE further comprises:
a Default Group ID (DGID) field for representing a group ID of a group that an AP wants to join; and
an Escape field for representing whether an AP is capable of accepting to establish a wireless link with another AP having a different DGID, the Escape field being adapted to represent an acceptable escape mode, an unacceptable escape mode, or all APs in the same group being in the unacceptable escape mode wherein APs in the same group being in the unacceptable escape mode are adapted to set a root AP and send the management packet via the root AP to inform other APs that the unacceptable escape mode has a priority higher than that of other modes.

50. The wireless meshing network of claim 49, wherein the IE further comprises a unique selection link field for representing that there is a unique AP having a minimum value of a hop count field in all other APs within a signal communication range of a predetermined AP, and wherein the AP is about to establish a wireless link with the predetermined AP the unique selection link field is enabled so as to inform the predetermined AP in a negotiation phase that once the unique selection link field is enabled a MAC address of the predetermined AP is filled in the unique selection link field instead of sending the management packet of the predetermined AP by broadcasting, and the AP is capable of establishing a link with the predetermined AP.

51. The wireless meshing network of claim 50, wherein in response to moving the predetermined AP to be in partial signal coverage with a first one of other APs, the unique selection link field associated with the predetermined AP is disabled, a link between the predetermined AP and the first one of other APs is interrupted when the predetermined AP is aware that there are fewer subsequent APs to be serviced by the first one of the other APs, and a wireless link between the predetermined AP and a second one of the other APs is established.

52. The wireless meshing network of claim 49, wherein in response to comparing a first condition of a service hop count difference between two APs having a minimum hop count within a signal communication range of the predetermined AP before linking is changed with a second condition of a service hop count difference between the same APs having a minimum hop count within the signal communication range of the predetermined AP after linking is changed, either the predetermined AP is adapted to change the link if it is determined that the first condition is larger than the second condition or the predetermined AP is not adapted to change the link if it is determined that the first condition is not larger than the second condition.

53. The wireless meshing network of claim 47, wherein the IE further comprises:
a Default Group ID (DGID) field for representing a group ID of a group that an AP wants to join; and
an Escape field for representing whether an AP is capable of accepting to establish a wireless link with another AP having a different DGID, the Escape field being adapted to represent an acceptable escape mode, an unacceptable escape mode, or all APs in the same group being in the unacceptable escape mode wherein APs in the same group being in the unacceptable escape mode are adapted to set a root AP and send the management packet via the root AP to inform other APs that the unacceptable escape mode has a priority higher than that of other modes.

54. The wireless meshing network of claim 53, wherein the IE further comprises a unique selection link field for representing that there is a unique AP having a minimum value of a hop count field in all other APs within a signal communication range of a predetermined AP, and wherein the AP is about to establish a wireless link with the predetermined AP the unique selection link field is enabled so as to inform the predetermined AP in a negotiation phase that once the unique selection link field is enabled a MAC address of the predetermined AP is filled in the unique selection link field instead of sending the management packet of the predetermined AP by broadcasting, and the AP is capable of establishing a link with the predetermined AP.

55. The wireless meshing network of claim 54, wherein in response to moving the predetermined AP to be in partial signal coverage with a first one of other APs, the unique selection link field associated with the predetermined AP is disabled, a link between the predetermined AP and the first one of other APs is interrupted when the predetermined AP is aware that there are fewer subsequent APs to be serviced by the first one of the other APs, and a wireless link between the predetermined AP and a second one of the other APs is established.

56. The wireless meshing network of claim 53, wherein in response to comparing a first condition of a service hop count difference between two APs having a minimum hop count within a signal communication range of the predetermined AP before linking is changed with a second condition of a service hop count difference between the same APs having a minimum hop count within the signal communication range of the predetermined AP after linking is changed, either the predetermined AP is adapted to change the link if it is determined that the first condition is larger than the second condition or the predetermined AP is not adapted to change the link if it is determined that the first condition is not larger than the second condition.

57. The wireless meshing network of claim 46, wherein the IE further comprises:
a Default Group ID (DGID) field for representing a group ID of a group that an AP wants to join; and
an Escape field for representing whether an AP is capable of accepting to establish a wireless link with another AP having a different DGID, the Escape field being adapted to represent an acceptable escape mode, an unacceptable escape mode, or all APs in the same group being in the unacceptable escape mode wherein APs in the same group being in the unacceptable escape mode are adapted to set a root AP and send the management packet via the root AP to inform other APs that the unacceptable escape mode has a priority higher than that of other modes.

58. The wireless meshing network of claim 57, wherein the IE further comprises a unique selection link field for representing that there is a unique AP having a minimum value of a hop count field in all other APs within a signal communication range of a predetermined AP, and wherein the AP is about to establish a wireless link with the predetermined AP the unique selection link field is enabled so as to inform the predetermined AP in a negotiation phase that once the unique selection link field is enabled a MAC address of the predetermined AP is filled in the unique selection link field instead of sending the management packet of the predetermined AP by broadcasting, and the AP is capable of establishing a link with the predetermined AP.

59. The wireless meshing network of claim 58, wherein in response to moving the predetermined AP to be in partial signal coverage with a first one of other APs, the unique selection link field associated with the predetermined AP is disabled, a link between the predetermined AP and the first one of other APs is interrupted when the predetermined AP is aware that there are fewer subsequent APs to be serviced by the first one of the other APs, and a wireless link between the predetermined AP and a second one of the other APs is established.

60. The wireless meshing network of claim 57, wherein in response to comparing a first condition of a service hop count difference between two APs having a minimum hop count within a signal communication range of the predetermined AP before linking is changed with a second condition of a service hop count difference between the same APs having a minimum hop count within the signal communication range of the predetermined AP after linking is changed, either the predetermined AP is adapted to change the link if it is determined that the first condition is larger than the second condition or the predetermined AP is not adapted to change the link if it is determined that the first condition is not larger than the second condition.

61. The wireless meshing network of claim 45, wherein the IE further comprises:
 a Default Group ID (DGID) field for representing a group ID of a group that an AP wants to join; and
 an Escape field for representing whether an AP is capable of accepting to establish a wireless link with another AP having a different DGID, the Escape field being adapted to represent an acceptable escape mode, an unacceptable escape mode, or all APs in the same group being in the unacceptable escape mode wherein APs in the same group being in the unacceptable escape mode are adapted to set a root AP and send the management packet via the root AP to inform other APs that the unacceptable escape mode has a priority higher than that of other modes.

62. The wireless meshing network of claim 61, wherein the IE further comprises a unique selection link field for representing that there is a unique AP having a minimum value of a hop count field in all other APs within a signal communication range of a predetermined AP, and wherein the AP is about to establish a wireless link with the predetermined AP the unique selection link field is enabled so as to inform the predetermined AP in a negotiation phase that once the unique selection link field is enabled a MAC address of the predetermined AP is filled in the unique selection link field instead of sending the management packet of the predetermined AP by broadcasting, and the AP is capable of establishing a link with the predetermined AP.

63. The wireless meshing network of claim 62, wherein in response to moving the predetermined AP to be in partial signal coverage with a first one of other APs, the unique selection link field associated with the predetermined AP is disabled, a link between the predetermined AP and the first one of other APs is interrupted when the predetermined AP is aware that there are fewer subsequent APs to be serviced by the first one of the other APs, and a wireless link between the predetermined AP and a second one of the other APs is established.

64. The wireless meshing network of claim 61, wherein in response to comparing a first condition of a service hop count difference between two APs having a minimum hop count within a signal communication range of the predetermined AP before linking is changed with a second condition of a service hop count difference between the same APs having a minimum hop count within the signal communication range of the predetermined AP after linking is changed, either the predetermined AP is adapted to change the link if it is determined that the first condition is larger than the second condition or the predetermined AP is not adapted to change the link if it is determined that the first condition is not larger than the second condition.

* * * * *